US012263361B2

(12) United States Patent
Darling et al.

(10) Patent No.: US 12,263,361 B2
(45) Date of Patent: Apr. 1, 2025

(54) WEARABLE AIR PURIFIER

(71) Applicant: Dyson Technology Limited, Wiltshire (GB)

(72) Inventors: Philip Stephen Darling, Bristol (GB); Matthew Jerome Jennings, Bristol (GB); Peter Knight Reid, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 1014 days.

(21) Appl. No.: 17/262,602

(22) PCT Filed: Jul. 11, 2019

(86) PCT No.: PCT/GB2019/051940
§ 371 (c)(1),
(2) Date: Jan. 22, 2021

(87) PCT Pub. No.: WO2020/021232
PCT Pub. Date: Jan. 30, 2020

(65) Prior Publication Data
US 2021/0260415 A1    Aug. 26, 2021

(30) Foreign Application Priority Data
Jul. 23, 2018   (GB) ...................................... 1811997

(51) Int. Cl.
*A62B 18/00* (2006.01)
*A62B 18/08* (2006.01)
(Continued)

(52) U.S. Cl.
CPC .......... *A62B 18/003* (2013.01); *A62B 18/006* (2013.01); *A62B 18/08* (2013.01);
(Continued)

(58) Field of Classification Search
CPC ..... A62B 18/003; A62B 18/006; A62B 18/08; A62B 18/084; A62B 23/02; A62B 7/10;
(Continued)

(56) References Cited

U.S. PATENT DOCUMENTS 4,852,562 A  *  8/1989  Howie ................... A42B 3/225
                                                128/201.24
5,350,281 A  *  9/1994  Hagshenas .......... F04D 29/5806
                                                417/369

(Continued)

FOREIGN PATENT DOCUMENTS

CN          101279100 A     10/2008
CN          201149338 Y     11/2008
(Continued)

OTHER PUBLICATIONS

English translation for DE202017107526, machine translated by Espacenet.com, translated on Jan. 11, 2024.*

(Continued)

*Primary Examiner* — Tu A Vo
(74) *Attorney, Agent, or Firm* — Tucker Ellis LLP

(57) ABSTRACT

A head wearable air purifier is provided. The head wearable air purifier includes a first speaker assembly and a second speaker assembly. The first speaker assembly includes a filter assembly, a motor-driven impeller for creating an airflow through the filter assembly, and an air outlet downstream from the filter assembly for emitting a filtered airflow from the speaker assembly. The head wearable air purifier further includes a nozzle and a control circuit. The nozzle is arranged to receive the filtered airflow from the first speaker assembly. Further, the nozzle includes an air outlet arranged to emit the received filtered airflow from the head wearable air purifier. The control circuit is arranged to control a rotational speed of the motor-driven impeller of the first (Continued)

speaker assembly such that the maximum rotational speed of the motor-driven impeller is from 9,000 to 18,000 RPM.

19 Claims, 20 Drawing Sheets

(51) Int. Cl.
  *A62B 23/02*     (2006.01)
  *B01D 46/00*    (2022.01)
  *B01D 46/58*    (2022.01)
  *G10K 11/178*   (2006.01)
  *H04R 1/10*     (2006.01)

(52) U.S. Cl.
  CPC .......... *A62B 18/084* (2013.01); *A62B 23/02* (2013.01); *B01D 46/0045* (2013.01); *B01D 46/58* (2022.01); *G10K 11/17881* (2018.01); *H04R 1/1008* (2013.01); *H04R 1/1041* (2013.01); *H04R 1/105* (2013.01); *H04R 1/1075* (2013.01); *B01D 2279/40* (2013.01); *B01D 2279/45* (2013.01); *G10K 2210/1081* (2013.01); *G10K 2210/3026* (2013.01); *G10K 2210/3027* (2013.01)

(58) Field of Classification Search
  CPC .............. B01D 46/0045; B01D 46/58; B01D 2279/40; B01D 2279/45; B01D 46/56; G10K 11/17881; G10K 2210/1081; G10K 2210/3026; G10K 2210/3027; H04R 1/1008; H04R 1/1041; H04R 1/105; H04R 1/1075; H04R 1/1091; H04R 5/0335; H04R 1/10; H04R 5/033; F04D 25/08–166
  See application file for complete search history.

(56) References Cited

U.S. PATENT DOCUMENTS

| | | | |
|---|---|---|---|
| 5,484,472 A | 1/1996 | Weinberg et al. | |
| 5,632,793 A | 5/1997 | Haggard | |
| 5,749,359 A | 5/1998 | Hansen | |
| 6,065,473 A * | 5/2000 | McCombs | A62B 18/003 128/200.24 |
| 6,910,961 B2 | 6/2005 | Niu | |
| 7,823,586 B2 | 11/2010 | Glazman | |
| 7,892,306 B2 | 2/2011 | Kummer et al. | |
| 8,948,409 B2 * | 2/2015 | Hua | H04R 1/1083 381/94.1 |
| 9,205,218 B1 | 12/2015 | Bachan et al. | |
| 10,244,306 B1 * | 3/2019 | Ku | H04R 3/02 |
| 10,362,399 B1 * | 7/2019 | Carino | H04R 5/033 |
| 10,517,980 B2 | 12/2019 | Kim et al. | |
| 2003/0147786 A1 | 8/2003 | Taylor | |
| 2003/0188743 A1 * | 10/2003 | Manne | A62B 18/003 128/201.22 |
| 2004/0055601 A1 * | 3/2004 | De Luca | A62B 18/003 128/201.25 |
| 2004/0184949 A1 | 9/2004 | Mcellen | |
| 2005/0284470 A1 | 12/2005 | Wei et al. | |
| 2006/0080431 A1 * | 4/2006 | Chao | H04R 1/1058 709/224 |
| 2007/0257383 A1 | 11/2007 | Chan | |
| 2008/0087282 A1 * | 4/2008 | Torgerson | A62B 18/003 128/205.29 |
| 2008/0304986 A1 * | 12/2008 | Kenyon | H02K 5/225 417/423.12 |
| 2009/0229469 A1 | 9/2009 | Campbell et al. | |
| 2010/0108071 A1 | 5/2010 | Macy, Jr. | |
| 2011/0268290 A1 * | 11/2011 | Lee | H04R 1/1091 381/74 |
| 2012/0138058 A1 * | 6/2012 | Fu | F04D 25/0666 128/204.23 |
| 2012/0174922 A1 | 7/2012 | Virr et al. | |
| 2013/0118506 A1 | 5/2013 | Osipov et al. | |
| 2014/0360496 A1 | 12/2014 | Reese | |
| 2015/0290479 A1 | 10/2015 | Augustine et al. | |
| 2015/0296917 A1 * | 10/2015 | Perusse | A42B 3/286 2/15 |
| 2016/0030700 A1 * | 2/2016 | Manne | A61K 33/00 128/203.18 |
| 2017/0087500 A1 | 3/2017 | Combs et al. | |
| 2017/0113075 A1 * | 4/2017 | Reiser | A62B 9/04 |
| 2017/0361133 A1 * | 12/2017 | Yu | F04D 19/007 |
| 2018/0114518 A1 * | 4/2018 | Scanlan | H04R 1/1008 |
| 2018/0236275 A1 * | 8/2018 | Song | A62B 18/10 |
| 2020/0406069 A1 * | 12/2020 | Fu | A63B 23/18 |

FOREIGN PATENT DOCUMENTS

| | | | | |
|---|---|---|---|---|
| CN | 102366737 A | 3/2012 | | |
| CN | 102716556 A | 10/2012 | | |
| CN | 202933925 U | 5/2013 | | |
| CN | 203170179 U | 9/2013 | | |
| CN | 203315577 U | 12/2013 | | |
| CN | 103961822 A | 8/2014 | | |
| CN | 104001397 A | 8/2014 | | |
| CN | 203775388 U | 8/2014 | | |
| CN | 203852758 U | 10/2014 | | |
| CN | 203852759 U * | 10/2014 | | |
| CN | 203852760 U | 10/2014 | | |
| CN | 203898976 U | 10/2014 | | |
| CN | 104159172 A | 11/2014 | | |
| CN | 203928189 U | 11/2014 | | |
| CN | 204034071 U | 12/2014 | | |
| CN | 204043074 U | 12/2014 | | |
| CN | 204145696 U | 2/2015 | | |
| CN | 204233633 U | 4/2015 | | |
| CN | 104826245 A | 8/2015 | | |
| CN | 204555192 U | 8/2015 | | |
| CN | 204601421 U | 9/2015 | | |
| CN | 104984489 A | 10/2015 | | |
| CN | 204864605 U | 12/2015 | | |
| CN | 204902075 U | 12/2015 | | |
| CN | 105381556 A | 3/2016 | | |
| CN | 205119379 U | 3/2016 | | |
| CN | 205191767 U | 4/2016 | | |
| CN | 105757824 A | 7/2016 | | |
| CN | 105797287 A | 7/2016 | | |
| CN | 105797290 A | 7/2016 | | |
| CN | 205494715 U | 8/2016 | | |
| CN | 205505229 U | 8/2016 | | |
| CN | 205783444 U | 12/2016 | | |
| CN | 106556070 A | 4/2017 | | |
| CN | 106823178 A | 6/2017 | | |
| CN | 206253237 U | 6/2017 | | |
| CN | 206381508 U | 8/2017 | | |
| CN | 107233675 A * | 10/2017 | .............. | A62B 7/10 |
| CN | 206713019 U | 12/2017 | | |
| CN | 108156546 A | 6/2018 | | |
| CN | 211328516 U | 8/2020 | | |
| DE | 3702750 A1 | 8/1988 | | |
| DE | 3707426 A1 | 9/1988 | | |
| DE | 3710234 A1 | 10/1988 | | |
| DE | 202017107526 U1 * | 2/2018 | | |
| GB | 2300814 A * | 11/1996 | .......... | A62B 18/003 |
| GB | 2529238 A | 2/2016 | | |
| IN | 103949017 A | 7/2014 | | |
| JP | S61-220746 A | 10/1986 | | |
| JP | S64-11620 A | 1/1989 | | |
| JP | 03-503249 A | 7/1991 | | |
| JP | 2007-202826 A | 8/2007 | | |
| JP | 2007-330291 A | 12/2007 | | |
| JP | 2009-61233 A | 3/2009 | | |
| JP | 2013-038989 A | 2/2013 | | |
| JP | 2013-84348 A | 5/2013 | | |
| JP | 2015-515202 A | 5/2015 | | |
| KR | 10-1366061 B1 | 2/2014 | | |
| KR | 10-2014-0119495 A | 10/2014 | | |
| KR | 10-1796969 B1 | 11/2017 | | |

(56) References Cited

FOREIGN PATENT DOCUMENTS

| WO | 90/05565 A1 | 5/1990 | |
| WO | 2005004993 A1 | 1/2005 | |
| WO | WO-2007028877 A2 * | 3/2007 | ........ A61M 16/0683 |
| WO | 2013/144099 A1 | 10/2013 | |
| WO | 2013/181080 A1 | 12/2013 | |
| WO | WO-2014031671 A1 * | 2/2014 | ............ A42B 3/286 |
| WO | 2014/090188 A1 | 6/2014 | |
| WO | 2015/140776 A1 | 9/2015 | |
| WO | 2017/081904 A1 | 5/2017 | |
| WO | 2017/120992 A1 | 7/2017 | |

OTHER PUBLICATIONS

English translation for CN 107233675, machine translated by Espacenet.com.*

English translation for CN 203852759, machine translated by Espacenet.com.*

Definition of the term "impeller", Merriamwebster.com.*

Definition of the term "impel", Merriamwebster.com.*

"Impellers information", Engineering 360, powered by IEEE Globalspec, Jun. 3, 2017.*

Office Action received for Chinese Patent Application No. 201910668232.7, mailed on Aug. 13, 2021, 17 pages (10 pages of English Translation and 7 pages of Original Document).

P. Eric Ganderson, translated by Li Zhe and Liu Shuhua, "The Handy Physics Answer Book", Shanghai Scientific & Technological Literature Publishing House, 2011, 19 pages.

Notification of Reasons for Refusal received for Japanese Application No. 2021-501300, mailed on Dec. 14, 2021, 4 pages (2 pages of English Translation and 2 pages of Original Document).

Evaluation Report dated Sep. 2, 2020, directed to CN Application No. ZL2019211699446; 10 pages.

International Search Report and Written Opinion mailed Oct. 7, 2019, directed to International Application No. PCT/GB2019/051940; 15 pages.

Rajakumar et al. (Nov. 2013). "Study on the Performance Deterioration of Mixed Flow Impeller due to Change in Tip Clearance," Journal of Thermal Science 22(6): 532-538.

Search Report dated Jan. 18, 2019, directed to GB Application No. 1811997.4; 1 page.

The First Office Action dated Feb. 2, 2021, directed to CN Application No. 201910668232.7; 20 pages.

* cited by examiner

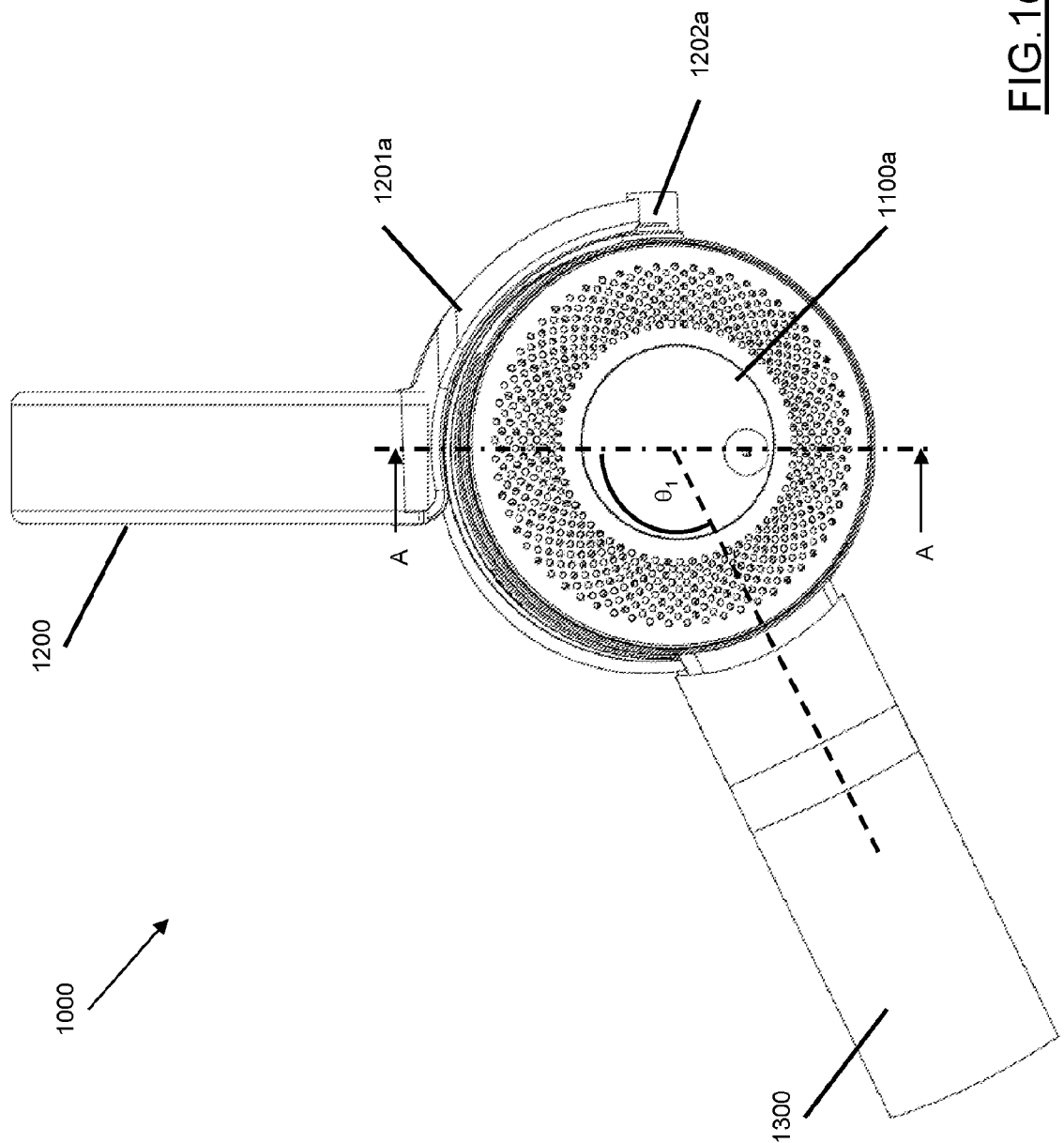

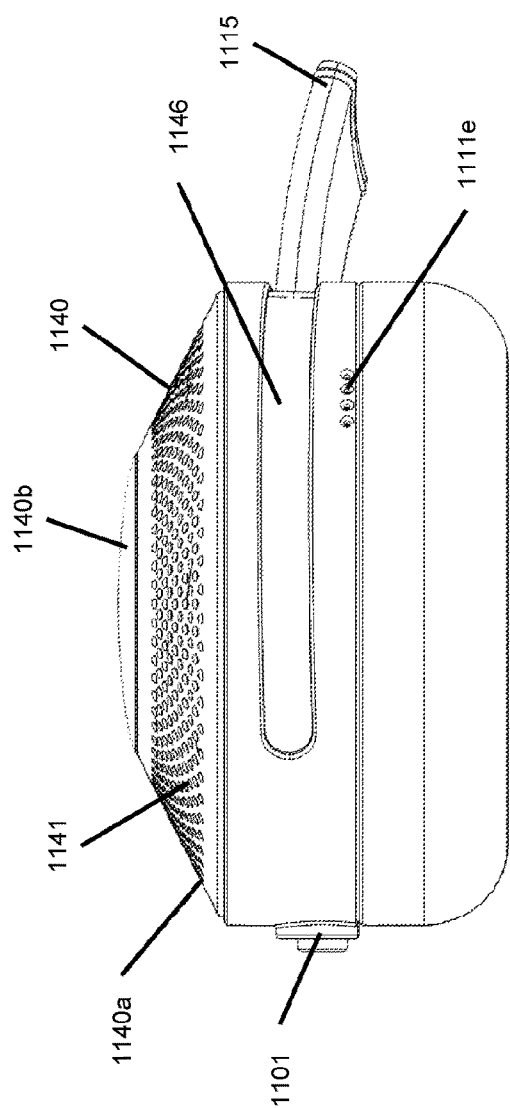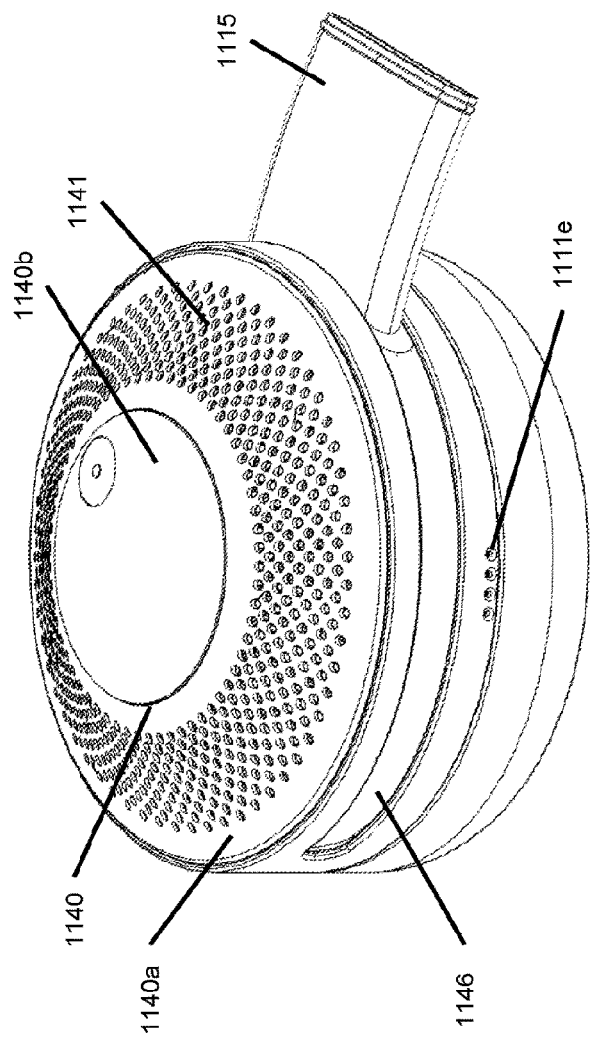

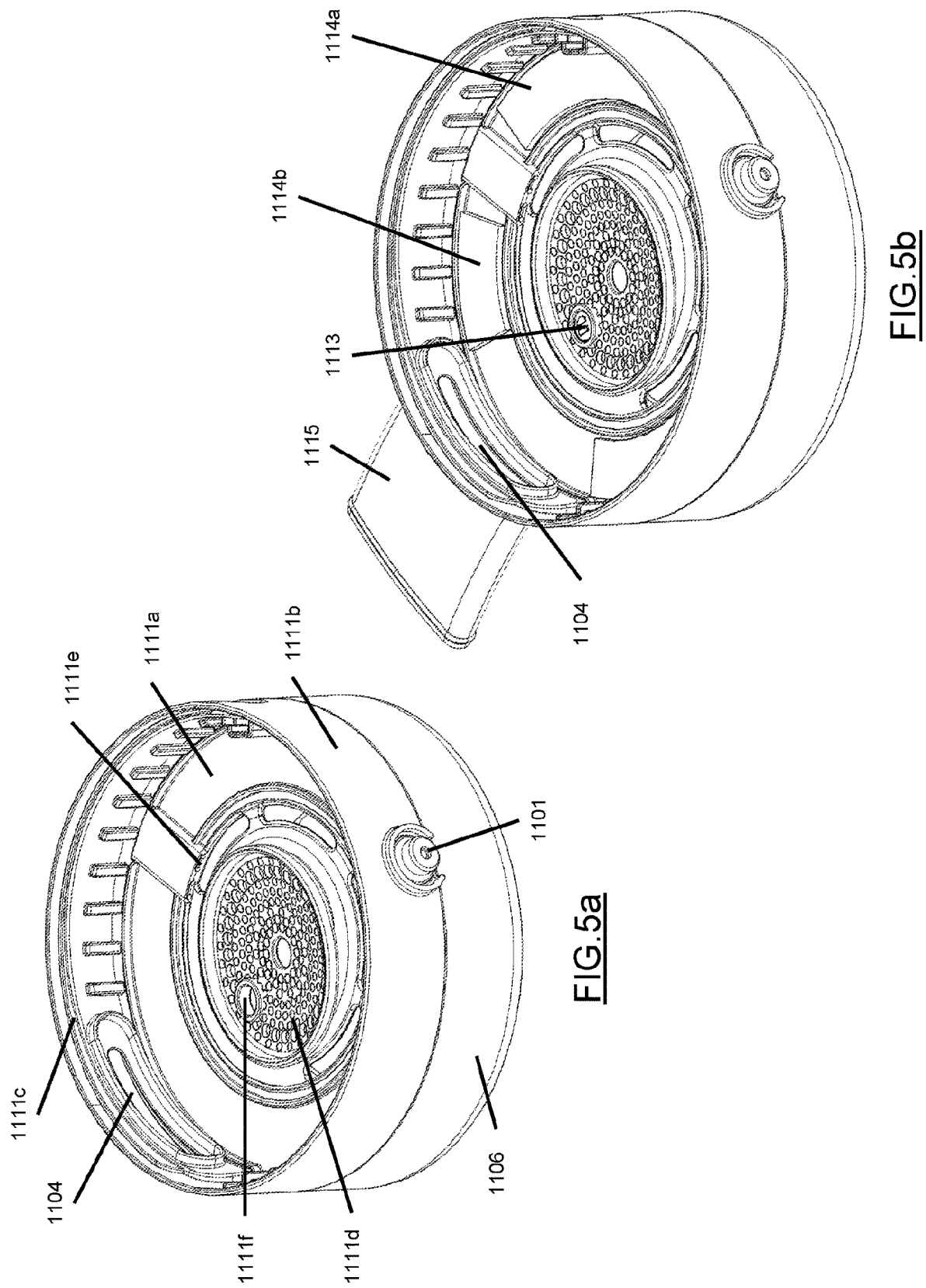

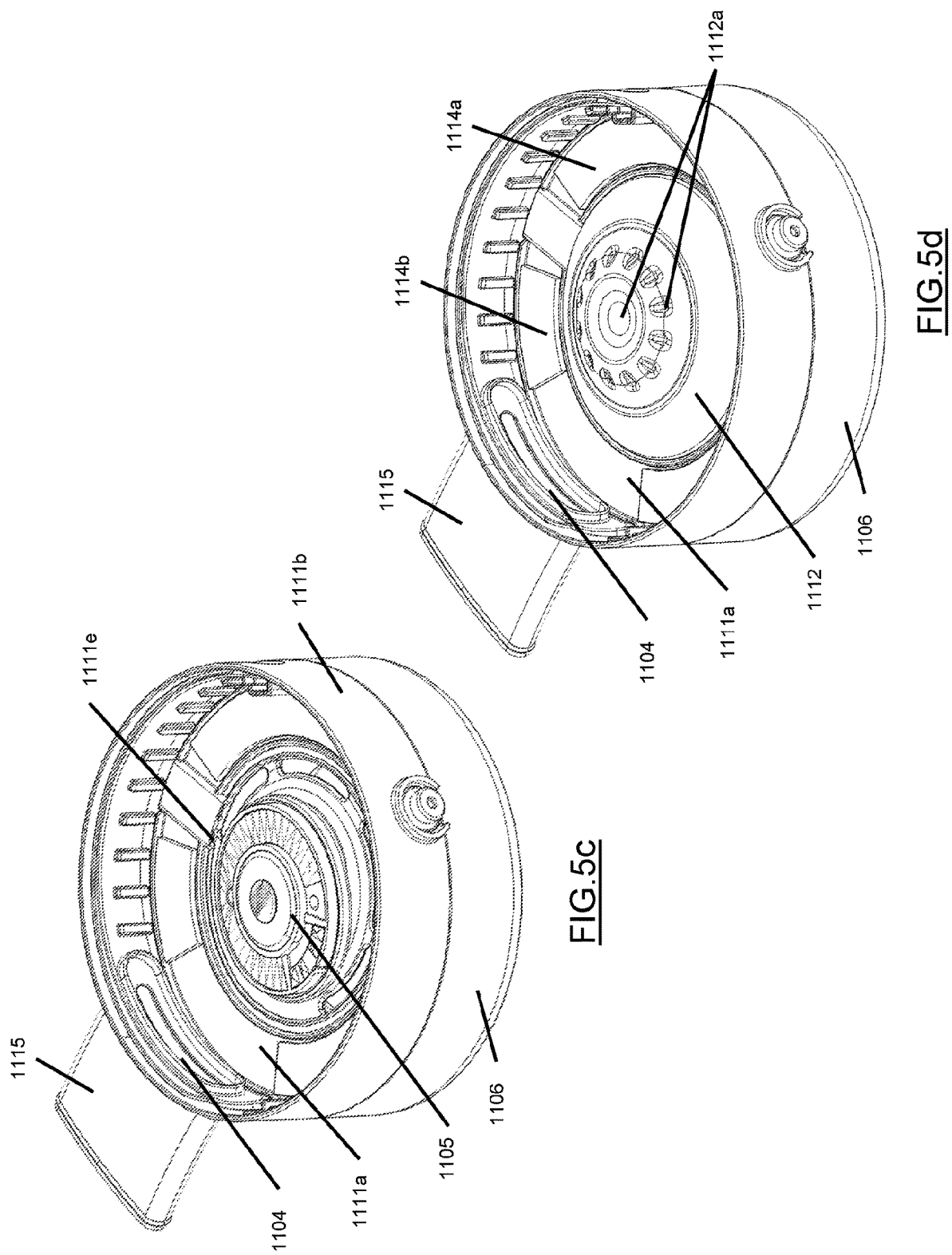

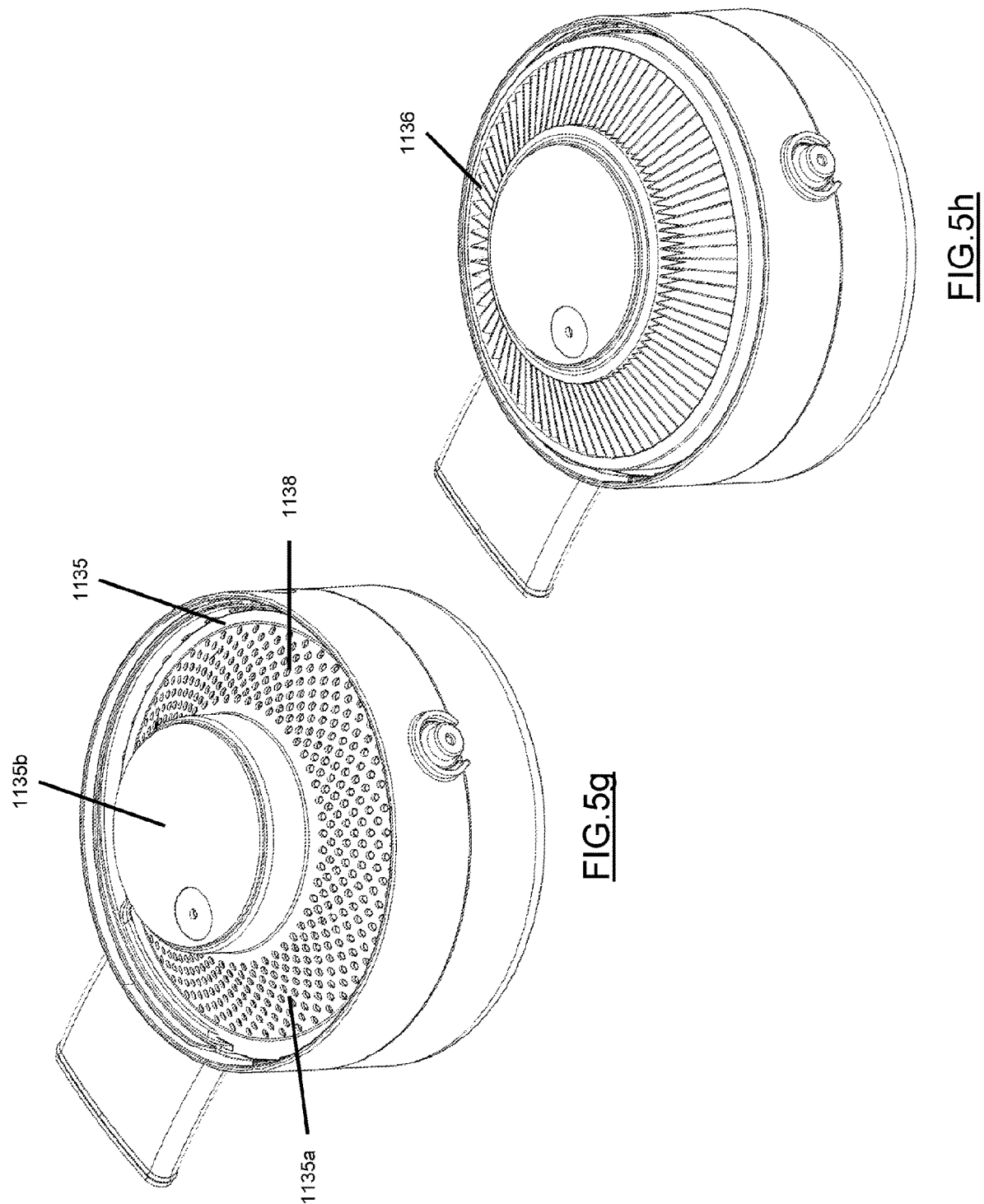

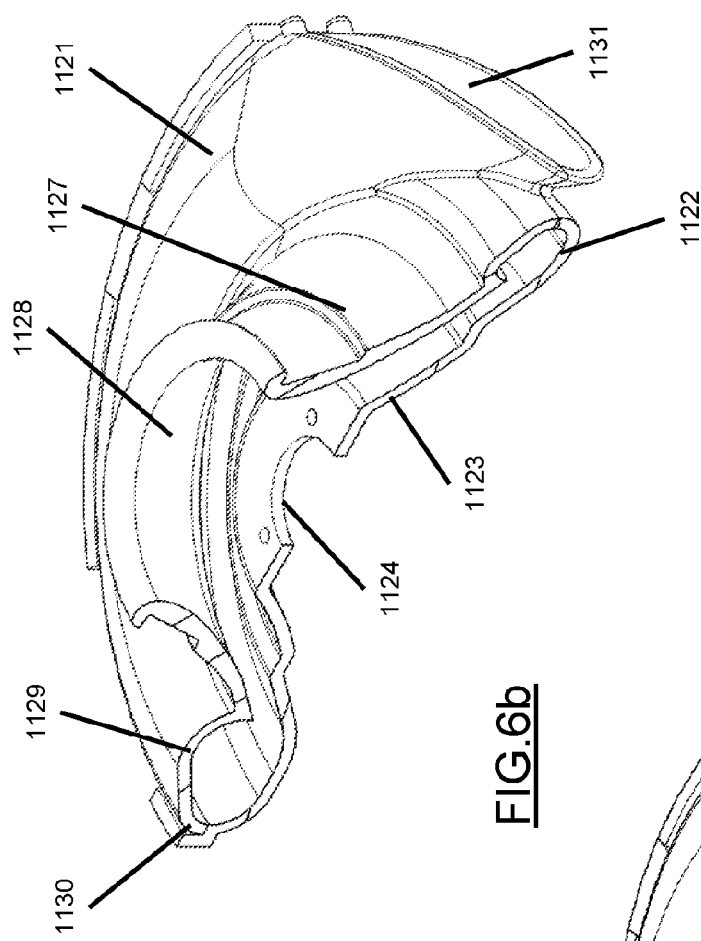
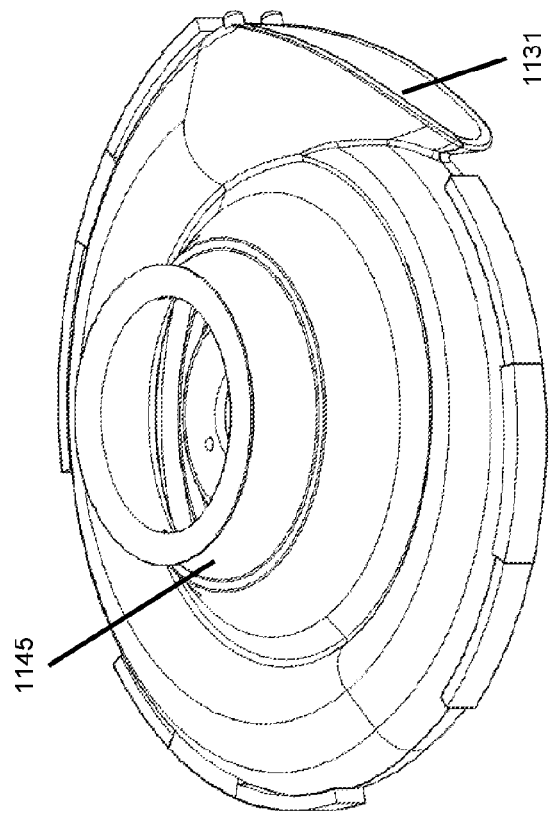
FIG.6b
FIG.6a

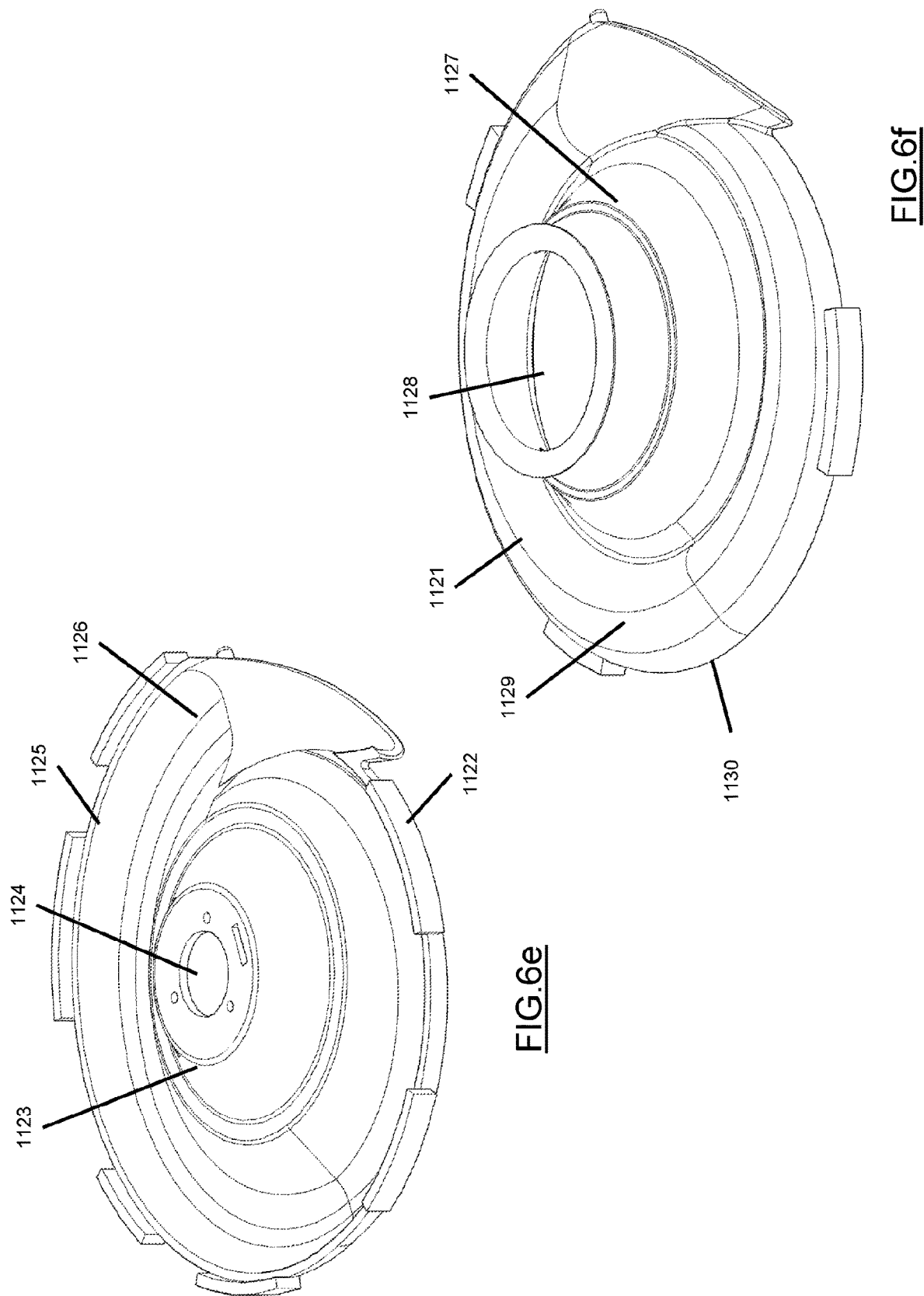

WEARABLE AIR PURIFIER

REFERENCE TO RELATED APPLICATIONS

This application is a national stage application under 35 USC 371 of International Application No. PCT/GB2019/051940, filed Jul. 11, 2019, which claims the priority of United Kingdom Application No. 1811997.4, filed Jul. 23, 2018, the entire contents of each of which is incorporated herein by reference.

FIELD OF THE DISCLOSURE

The present invention relates to a wearable air purifier and specifically to a head worn air purifier.

BACKGROUND OF THE DISCLOSURE

Air pollution is an increasing problem and a variety of air pollutants have known or suspected harmful effects on human health. The adverse effects that can be caused by air pollution depend upon the pollutant type and concentration, and the length exposure to the polluted air. For example, high air pollution levels can cause immediate health problems such as aggravated cardiovascular and respiratory illness, whereas long-term exposure to polluted air can have permanent health effects such as loss of lung capacity and decreased lung function, and the development of diseases such as asthma, bronchitis, emphysema, and possibly cancer.

In locations with particularly high levels of air pollution, many individuals have recognised the benefits of minimising their exposure to these pollutants and have therefore taken to wearing face masks with the aim of filtering out at least a portion of the pollutants present in the air before it reaches the mouth and nose. These face masks range from basic dust masks that merely filter out relatively large dust particles, to more complex air-purifying respirators that require that the air pass through a filter element or cartridge. However, as these face masks typically cover at least the users mouth and nose they can make normal breathing more laborious and can also cause problems with the user's ability to speak to others, such that there is some reluctance to make use of such face masks on a day-to-day basis despite the potential benefits.

As a consequence, there have been various attempts to develop air purifiers that can be worn by the user but that do not require the user's mouth and nose to be covered. For example, there are various designs for wearable air purifiers that are worn around the neck of the user and that create a jet of air that is directed upwards towards the user's mouth and nose. Whilst these may be more socially acceptable, they are generally less effective at limiting the user's exposure to airborne pollutants than some of the best performing face-worn filters. This is largely due to the lack of accuracy with which they deliver the jet of air to the user's mouth and nose and to the fact that flows of unfiltered air that can still reach the user's mouth and nose.

WO2017120992, CN103949017A, KR101796969B1 and CN203852759U all describe head-worn purifiers that provide an alternative to both face masks and neck-worn purifiers. Each of WO2017120992, CN103949017A and KR101796969B1 describe a headset having a pair of earphones on opposite sides of a headband and a microphone provided on the end of an arm that extends from one of the earphones.

In WO2017120992 a separate air filtering unit (5) is connected by a pipe (6) to an air outlet (1) provided on the arm that supports the microphone (2). Filtered air is generated by the air filtering unit (5) and pumped through the pipe (6) to be discharged from the air outlet (1). This head-worn purifier takes the form of a conventional head-set, and does not completely cover the user's mouth and nose, and is therefore likely to be more socially acceptable then a face mask. In addition, by providing the air delivery outlet on the end of a conventional microphone arm, this head-worn purifier should be capable of providing more accurate delivery of purified air to the user's nose and/or mouth than a neck-worn purifier. However, this head-worn purifier will still allow a not insignificant amount of unfiltered air to reach the user's mouth and nose. Furthermore, the requirement for a separate air filtering unit makes the purifier more complex and more cumbersome for the user.

In CN103949017A a fan (6) is incorporated into one of the earphones (8), with this fan (6) being used to pump air through a duct (7) to an air purifying device (5) provided on the end of the arm that supports the microphone (3). Whilst this head-worn purifier has incorporated the air purification functionality into the headset, the air purification and delivery performance will be limited due to the small space available for both filtering pollutants from the air supplied by the fan and for delivering filtered air to the user. In particular, the small space available will significantly limit both the maximum flow rate and the filtering efficiency due to the small filter area available. Furthermore, as with the head-worn purifier described in WO2017120992, this head-worn purifier will still allow a significant amount of unfiltered air to reach the user's mouth and nose.

SUMMARY OF THE DISCLOSURE

Disclosed is a wearable air purifier that provides improved air purification and air delivery performance when compared with prior wearable air purifiers.

According to the present invention there is provided a head wearable air purifier. The head wearable air purifier comprises a first speaker assembly arranged to be worn over a first ear of a user and a second speaker assembly arranged to be worn over a second ear of the user, wherein the first speaker assembly comprises a filter assembly, a motor-driven impeller for creating an airflow through the filter assembly, and an air outlet downstream from the filter assembly for emitting a filtered airflow from the speaker assembly. The head wearable air purifier further comprises a nozzle arranged to receive the filtered airflow from the first speaker assembly, the nozzle comprising an air outlet arranged to emit the received filtered airflow from the head wearable air purifier, and a control circuit arranged to control a rotational speed of the motor-driven impeller of the first speaker assembly such that the maximum rotational speed of the motor-driven impeller is from 9000 to 18,000 RPM, The control circuit may be arranged to control a rotational speed of the motor-driven impeller of the first speaker assembly such that the maximum rotational speed of the motor-driven impeller is from 10,000 to 14,000 RPM, and is preferably from 10,000 to 12,000 RPM.

The first speaker assembly may be configured to provide/generate a filtered airflow having a maximum flow rate of at least 1.2 litres per second. Preferably, the first speaker assembly is configured to provide/generate a filtered airflow having a maximum flow rate of at least 1.25 litres per second. Optionally, the first speaker assembly is configured to provide/generate a filtered airflow having a maximum flow rate of at least 1.5 litres per second. The first speaker assembly may be configured to provide/generate a filtered airflow having a maximum pressure of at least 500 Pa.

The impeller of the first speaker assembly may have a tip diameter of no less than 25 mm. Preferably, the impeller of the first speaker assembly has a tip diameter of no less than 35 mm, and more preferably of no less than 40 mm. The impeller of the first speaker assembly may be a mixed flow impeller that has a generally conical shape. The impeller of the first speaker assembly may be unshrouded.

Preferably, the second speaker assembly is substantially the same as the first speaker assembly. The second speaker assembly may comprise a filter assembly, a motor-driven impeller for creating an airflow through the filter assembly, and an air outlet downstream from the filter assembly for emitting a filtered airflow from the speaker assembly, and the nozzle may be further arranged to receive the filtered airflow from the second speaker assembly and to emit both of the received filtered airflows from the head wearable air purifier. The control circuit may then be arranged to control a rotational speed of the motor-driven impeller of the first speaker assembly such that the maximum rotational speed of the motor-driven impeller is from 9000 to 18,000 RPM, The control circuit may be arranged to control a rotational speed of the motor-driven impeller of the second speaker assembly such that the maximum rotational speed of the motor-driven impeller is from 10,000 to 14,000 RPM, and is preferably from 10,000 to 12,000 RPM.

The second speaker assembly may be configured to provide/generate a filtered airflow having a maximum flow rate of at least 1.2 litres per second. Preferably, the second speaker assembly is configured to provide/generate a filtered airflow having a maximum flow rate of at least 1.25 litres per second. Optionally, the second speaker assembly is configured to provide/generate a filtered airflow having a maximum flow rate of at least 1.5 litres per second. The second speaker assembly may be configured to provide/generate a filtered airflow having a maximum pressure of at least 500 Pa.

The impeller of the second speaker assembly may have a tip diameter of no less than 25 mm. Preferably, the impeller of the second speaker assembly has a tip diameter of no less than 35 mm, and more preferably of no less than 40 mm. The impeller of the second speaker assembly may be a mixed flow impeller that has a generally conical shape. The impeller of the second speaker assembly may be unshrouded.

Preferably, the control circuit is arranged to implement active noise cancellation for both the first speaker assembly and the second speaker assembly. The first speaker assembly and the second speaker assembly may then each comprise at least one of a feedback microphone and a feedforward microphone that are arranged to provide active noise cancellation inputs to the control circuit.

The control circuit may comprise one or more circuit boards disposed within at least one of the first speaker assembly and the second speaker assembly.

Preferably, the head wearable air purifier comprises a headphone system, wherein first speaker assembly is mounted on a first end of a headband and the second speaker assembly mounted on an opposite, second end of the headband, the headband being arranged to be worn on the head of a user.

BRIEF DESCRIPTION OF THE FIGURES

An embodiment of the present invention will now be described, by way of example only, with reference to the accompanying drawings, in which:

FIG. 1b is a front view of the head wearable air purifier of FIG. 1a;

FIG. 1d is a side view of the head wearable air purifier of FIG. 1a;

FIG. 2 is a cross-sectional view of the head wearable air purifier of FIG. 1a;

FIG. 3a is a side view of a speaker assembly of the head wearable air purifier of FIG. 1a;

FIG. 3b is a perspective view of a speaker assembly of the head wearable air purifier of FIG. 1a;

FIGS. 5a to 5h are perspective views of the speaker assembly of FIGS. 3a and 3b at various levels of construction;

FIG. 6a is a perspective view of an impeller casing of the speaker assembly of FIGS. 3a and 3b;

FIG. 6b is a cross-sectional view of the impeller casing of FIG. 6a;

FIGS. 6c and 6d are cross-sectional views through the impeller casing of FIG. 6a;

FIG. 6e is a perspective view of a rear casing section of the impeller casing of FIG. 6a;

FIG. 6f is a perspective view of a front casing section of the impeller casing of FIG. 6a;

FIG. 10b is a cross-sectional view of the filter assembly of FIG. 10a;

FIG. 11 is a perspective view of a nozzle when detached from the head wearable air purifier of FIG. 1a;

DETAILED DESCRIPTION OF THE DISCLOSURE

Figure 1A:
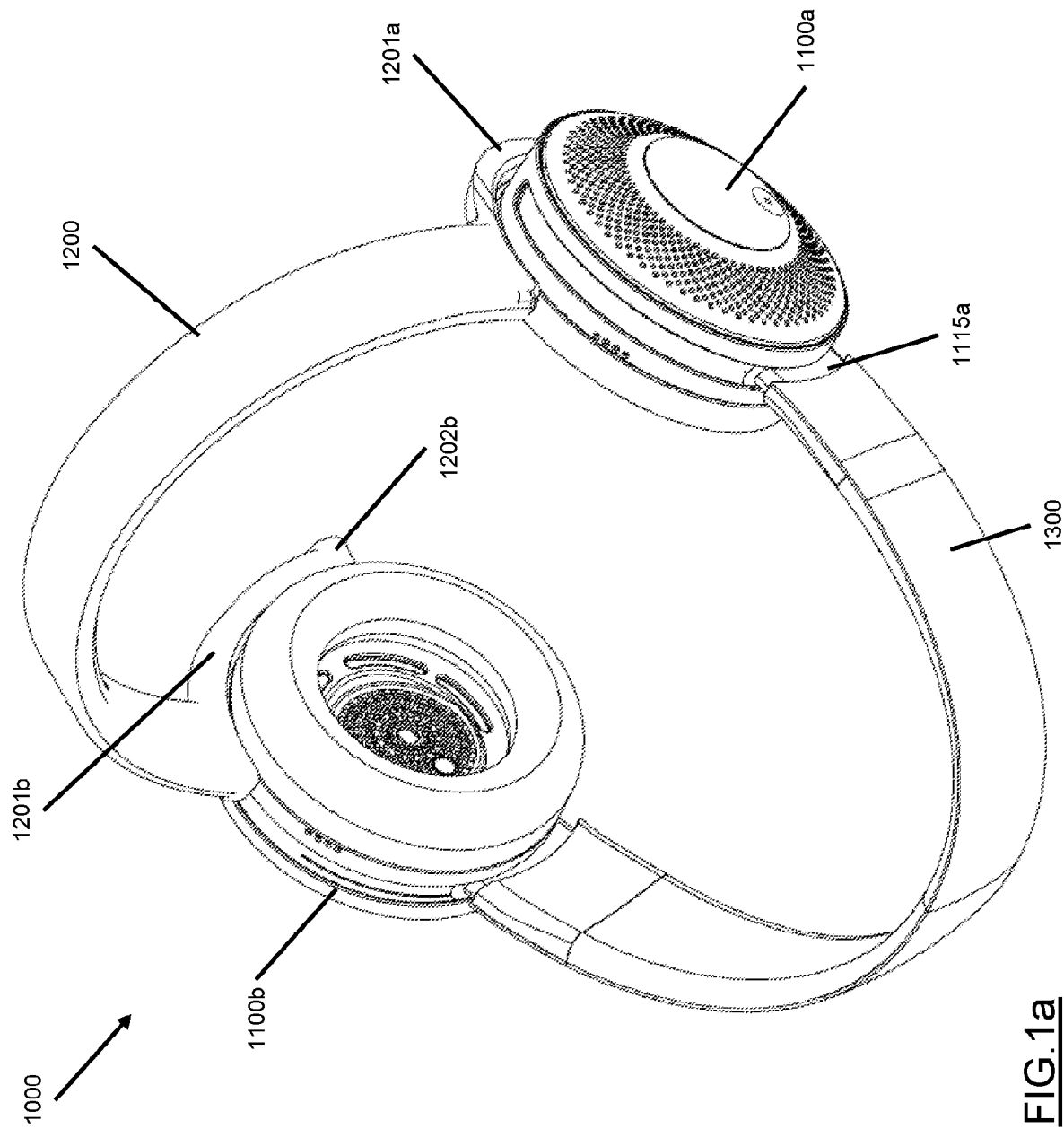
FIG. 1a is a front perspective view of an embodiment of a head wearable air purifier as described herein.

There will now be described a head wearable air purifier that provides several advantages over conventional wearable air purifiers. The term "air purifier" as used herein refers to a device or system capable of removing contaminants from air and emitting a supply of purified or filtered air. The term "head wearable" is used herein to define an item as being capable of or suitable for being worn on the head of a user.

The head wearable air purifier comprises a headphone system comprising a pair of speaker assemblies mounted on a headband. A first speaker assembly is mounted on a first end of the headband and a second speaker assembly is mounted on an opposite, second end of the headband. One or both of the first speaker assembly and the second speaker assembly then comprise a filter assembly, an impeller for creating an airflow through the filter assembly, a motor arranged to drive the impeller and an air outlet downstream from the filter assembly for emitting the filtered airflow from the speaker assembly. The impeller is a mixed flow impeller that has a generally conical or frusto-conical shape, and both the impeller and the motor are disposed within an impeller casing that is generally frusto-conical in shape. The head wearable air purifier then further comprises a nozzle arranged to receive the filtered airflow from one or both of the first speaker assembly and the second speaker assembly, the nozzle comprising an air outlet arranged to emit the received filtered airflow from the head wearable air purifier.

The term "headphones" as used herein refers to a pair of small loudspeakers, or speakers, joined by a headband that is designed to be worn on or around the head of a user. Typically, the speakers are provided by electroacoustic transducers that convert an electrical signal to a corresponding sound. Circumaural headphones, often referred to as full-size or over-ear headphones, have earpads whose shape is that of a closed loop (e.g. circular, elliptical etc.) so that they encompass the entire ear. Because these headphones completely surround the ear, circumaural headphones can be designed to fully seal against the head to attenuate external noise. Supra-aural headphones, often referred to as on-ear headphones, have earpads that press against the ears, rather than around them. This type of headphone generally tends to be smaller and lighter than circumaural headphones, resulting in less attenuation of outside noise.

The term "conical" as used herein refers to an object having the shape of a cone. The term "cone" as used herein refers to a three-dimensional geometric shape that tapers smoothly from a flat base (frequently, though not necessarily, circular) to a point called the apex or vertex. The term "cone" therefore encompasses a right circular cone that has a circular base and an axis that passes through the centre of the base at right angles to its plane. The perimeter of the base of a cone is called the "directrix", and each line between the directrix and apex is a "generatrix" or "generating line" of the conical surface of the cone. The term "frusto-conical" as used herein refers to an object having the shape of a frustocone, The term "frustocone" as used herein refers to the portion of a cone that remains when a region including its apex is cut off by a truncation plane that is parallel to the base of the cone. The term "frustocone" is synonymous with the terms "conical frustum" and is encompasses a right circular conical frustum that has a circular base end and a circular top end, the diameter of the circular base end being greater than that of the circular top end, and a truncated conical surface extending between the base end and the top end.

Figure 1B:
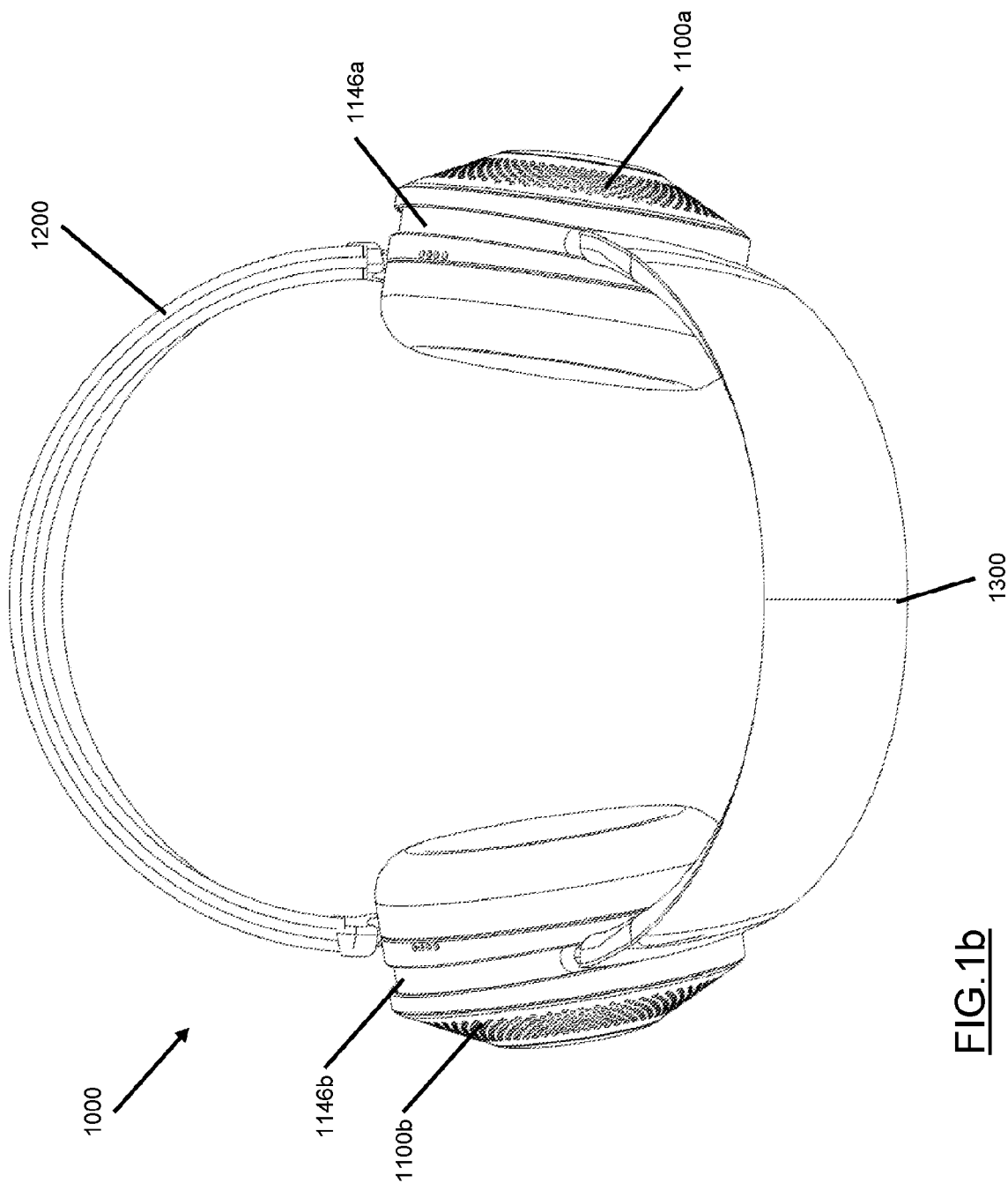
Figure 1C:
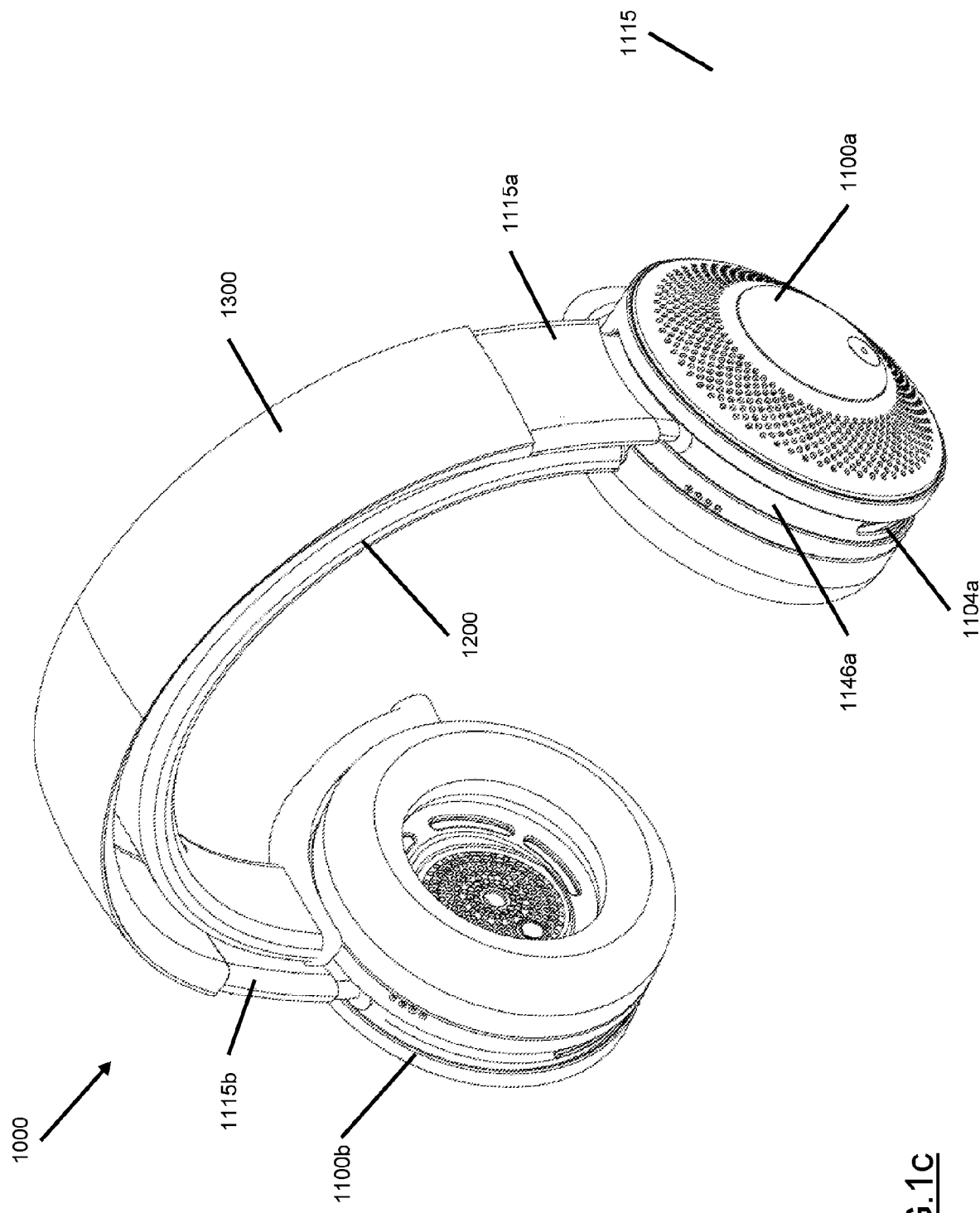
FIG. 1c is a front perspective view of the head wearable air purifier of FIG. 1a with the nozzle stowed over the headband.
Figure 2:
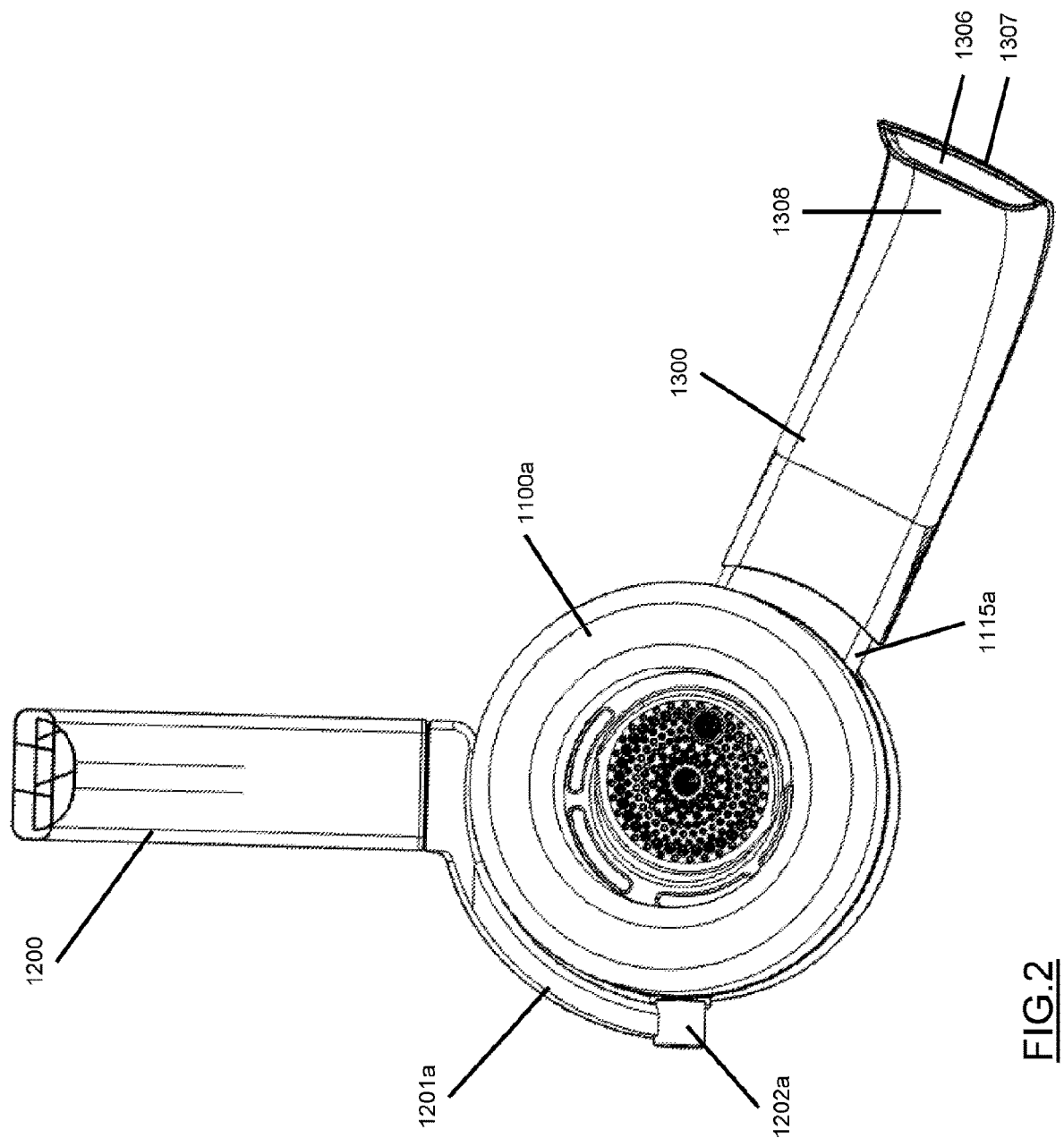

FIGS. 1a, 1b and 1c are external views of an embodiment of a head wearable air purifier 1000. The head wearable air purifier 1000 comprises a pair of generally cylindrical speaker assemblies 1100a, 1100b connected by an arcuate headband 1200, and a nozzle 1300 that extends between and is connected at opposite ends to both speaker assemblies 1100a, 1100b. FIG. 2 is a cross-sectional view of the air purifier 1000 taken along the axis of the headband 1200 and also shows a cross-section through the axis of the arcuate nozzle 1300, wherein the axis of a curve is the straight line that bisects the curve at right angles and divides the curve into two symmetrical portions. FIG. 3a then shows a side view of a speaker assembly 1100 of the air purifier 1000 of FIGS. 1a to 1 c, whilst FIG. 3b shows a perspective view of a speaker assembly 1100 of the air purifier 1000 of FIGS. 1a to 1 c, and FIG. 4 is a cross-sectional view through the speaker assembly 1100 of FIG. 3 taken along line A-A.

In the illustrated embodiment, each end of the headband 1200 is provided with an arcuate support arm 1201a, 1201b that is perpendicular to the headband 1200 (i.e. such that the plane that is parallel to the length of the arcuate headband 1200 is perpendicular to the plane that is parallel to the length of the arcuate support arm 1210). A first end of each support arm 1201a, 1201b is attached to a rear surface of the headband 1200 such that the support arm 1201a, 1201b extends rearward and downward from the headband 1200. An opposite, second end of each support arm 1201a, 1201 b is then provided with a socket or gudgeon 1202a, 1202b that faces forward.

As shown in FIG. 3a, each of the cylindrical speaker assemblies 1100 are then provided with a mounting projection or pintle 1101 that projects from an outer surface of the speaker assembly 1100. The socket/gudgeon 1202a, 1202b provided on each of the support arms 1201 is configured to receive and retain the projection/pintle 1101 that projects from the outer surface of the corresponding speaker assembly 1100. The engagement of the projections 1101 within the sockets 1202 provided on the support arms 1201 therefore forms a gimbal or hinge that pivotally supports the speaker assemblies 1100 when attached to the ends of headband 1200.

Figure 4:
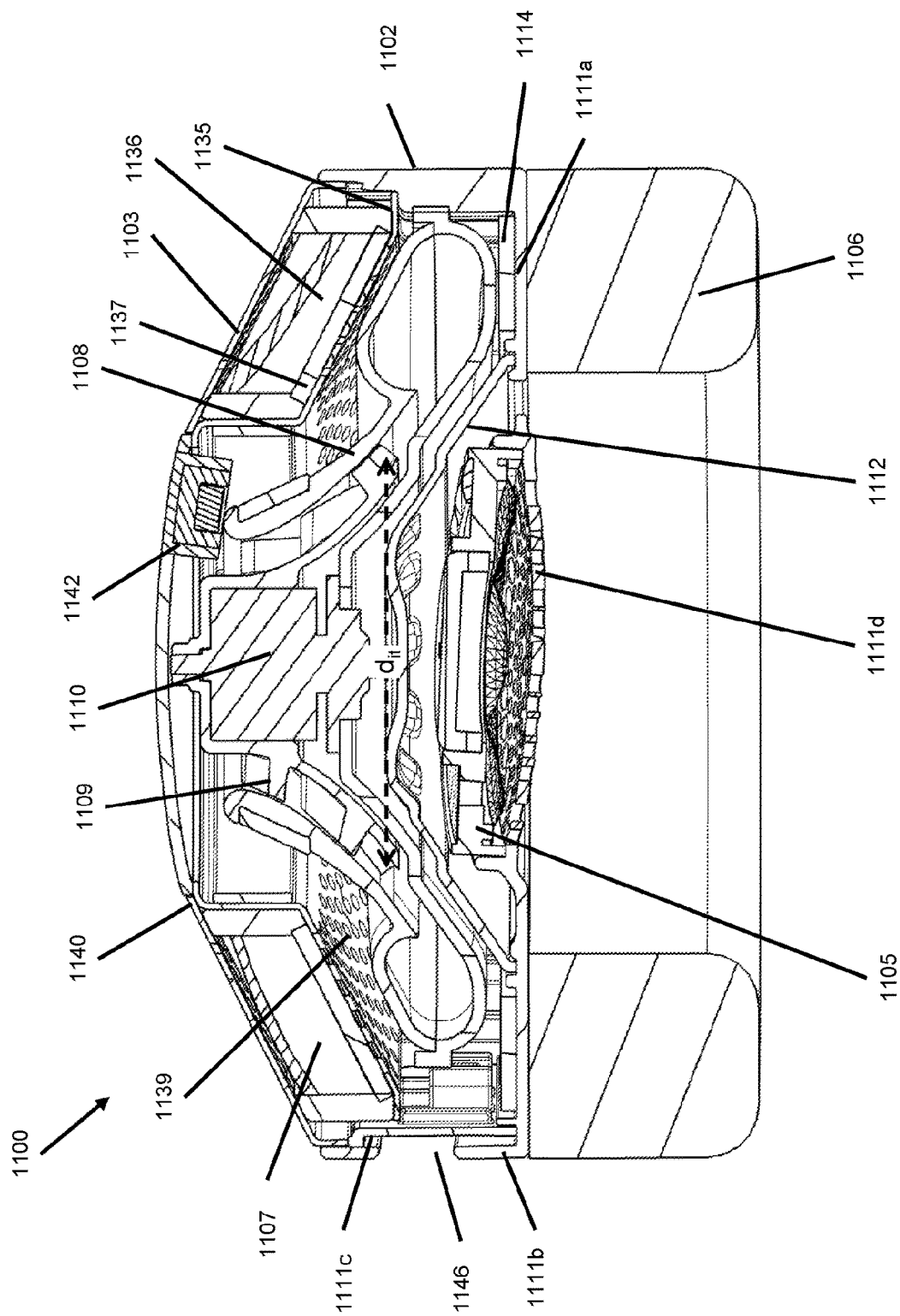
FIG. 4 is a cross-sectional view through the speaker assembly of FIG. 1d taken along line A-A.

As shown in FIG. 4, each of the pair of speaker assemblies 1100 further comprises a speaker housing or enclosure 1102 having an air inlet 1103 and an air outlet or discharge port 1104, a speaker or driver unit 1105 within the housing 1102, and an earpad 1106 arranged to enclose the speaker 1105 and to encompass or press against an ear of a user. In addition, each of the pair of speaker assemblies 1100 further comprises a filter assembly 1107 within speaker housing 1102 and an impeller casing 1108 within the speaker housing 1102. Disposed within the impeller casing 1108 is an impeller 1109 for creating an airflow through the filter assembly 1107 and a motor 1110 arranged to drive the impeller 1109. The air outlet or discharge port 1104 is downstream (i.e. relative to the airflow generated by the impeller 1109) from the filter assembly 1107 and is arranged to emit the filtered/purified airflow from the speaker assembly 1100. In the illustrated embodiment, the air outlet or discharge port 1104 of each speaker assembly 1100 is provided in a side of the speaker assembly 1100, with the air outlet or discharge port 1104 of both speaker assemblies 1100a, 1100b being generally parallel with one another when attached to the ends of headband 1200.

FIGS. 5a to 5h are perspective views of the speaker assembly of FIG. 2 at various levels of construction. As shown in FIGS. 4 and 5a to 5d, the speaker housing 1102 comprises a speaker chassis 1111 upon which the speaker/driver unit 1105 is mounted and a generally frusto-conical speaker cover 1112 mounted on the speaker chassis 1111 over the speaker 1105. In the illustrated embodiment, the speaker chassis 1111 comprises a generally circular base 1111a that is surrounded by a cylindrical outer side wall 1111b and an arcuate inner side wall 1111c located concentrically within and adjacent to the outer side wall 1111b such that an arcuate slot is defined between the arcuate inner side wall 1111c and an adjacent portion of the cylindrical outer side wall 1111b. The air outlet or discharge port 1104 is then defined by corresponding, aligned apertures formed in both the arcuate inner side wall 1111c and the cylindrical outer side wall 1111b.

A central portion of the base 1111a provides a driver support plate 1111d upon which the speaker/driver unit 1105 can be located. The driver support plate 1111d of the speaker chassis 1111 is provided with an array of apertures for allowing sound generated by the speaker/driver unit 1105 to pass through the speaker chassis 1111 into the space enclosed by earpad 1106. In addition, the driver support plate 1111d is angled or tilted relative to the peripheral portion of the base 1111a of the speaker chassis 1111. The angle or tilt of the driver support plate 1111d is chosen so that the speaker/driver unit 1105 is substantially parallel with the ears when the head wearable air purifier 1000 is worn on the head of a user with the speaker assembly 1100 over the user's ear. For example, in the illustrated embodiment, the angle of the driver support plate 1111d relative to the peripheral portion of the base 1111a is from 10 to 15 degrees.

The speaker chassis 1111 can also be provided with a number of ports 1111e that are configured to allow a small volume of air to pass between the outside of the speaker assembly 1100 and the space behind the speaker/driver unit 1105. In the illustrated embodiment, the ports 1111e are provided in the base 1111a of the speaker chassis 1111 and extend through the base 1111a from a point within the speaker chassis 1111 that is adjacent to the central portion that provides the driver support plate 1111d to an outer surface of the cylindrical outer side wall 1111b.

In addition, a feedback microphone 1113 for active noise cancellation (ANC) can be provided on the speaker chassis 1111. The feedback microphone 1113 is arranged to provide data to a control circuit 1114, with the control circuit 1114 then being configured to implement active noise cancellation (ANC) when controlling the speaker/driver unit 1105. In the illustrated embodiment, the feedback microphone 1113 is disposed within a corresponding aperture 1111f provided in the driver support plate 1111c. For active noise cancellation (ANC) applications, a feedback microphone 1113 is provided in the interior of the ear pad 1106, adjacent to the speaker/driver unit 1105, in order to acquire the sounds that are reaching the user so that any unwanted noise can be identified and cancelled out. A feedback microphone is therefore often referred to as an error microphone. Providing the speaker assembly 1100 with a feedback microphone 1113 is particular useful, as it provides that noise generated by the motor 1110 and/or the impeller 1109 can be detected by the feedback microphone 1113 and cancelled out along with any other unwanted background or ambient noise.

In the illustrated embodiment, a control circuit 1114 is disposed on or mounted to the peripheral portion of the speaker chassis 1111. The control circuit 1114 therefore at least partially encircles the speaker/driver unit 1105 (i.e. is disposed outside/around a periphery of the speaker/driver unit 1105) when the speaker/driver unit 1105 is mounted on to the driver support plate 1111d. In the illustrated embodiment, the control circuit 1114 comprises two arcuate circuit boards 1114a, 1114b; however, in alternative arrangements the control circuit 1114 could equally comprise more than two arcuate circuit boards or a single arcuate or annular circuit board.

The control circuit 1114 controls both the motor 1110 and the speaker/driver unit 1105 based on control inputs received from a user. The control circuit 1114 also provides one or more wireless communication modules that allows the purifier 1000 to connect to one or more wireless networks using Wi-Fi, Bluetooth or some other form of wireless personal area network (WPAN). A user of the purifier 1000 can then wirelessly connect to and communicate with the purifier 1000 using a personal computer device so that they can send and receive data to and from the purifier 1000, provide user inputs etc. The control circuit 1114 may also have a wired connection (not shown) to a touch screen and/or one or more physical user control devices (not shown) that are provided on the purifier 1000 and/or that are accessible to the user.

The speaker assembly 1100 is also provided with a hollow, rigid outlet duct 1115 that extends from the speaker housing 1102 and that is arranged to connect the air outlet 1104 of the speaker assembly 1100 to an air inlet of the nozzle 1300. The rigid outlet duct 1115 is further arranged so that it can revolve relative to the speaker housing 1102, around at least a portion of the periphery of the speaker housing 1102, so that the angle between the nozzle 1300 and the headband 1200 can be changed and so that the nozzle 1300 can be stowed over the headband 1200 when not in use, as illustrated in FIG. 1c.

Advantageously, the speaker assembly 1100 is arranged so that the revolution of the rigid outlet duct 1115 around the periphery of the speaker housing 1102 is independent of the impeller casing 1108, such that it can revolve relative to both the speaker housing 1102 and to the impeller casing 1108. This arrangement provides that the nozzle 1300 can be rotated towards and stowed over the headband 1200 when not in use without the need for any of the components that are internal to the speaker housing 1102 to be rotatable relative to the speaker housing 1102, which would complicate the construction of the speaker assembly 1100.

In addition, the speaker assembly 1100 is arranged so that the revolution of the rigid outlet duct 1115 around the periphery of the speaker housing 1102 causes the rigid outlet duct 1115 to move away from the earpad 1106. This arrangement provides when the nozzle 1300 is rotated towards the headband 1200 the rigid outlet ducts 1115 that extend from each of the first speaker assembly 1100a and the second speaker assembly 1100b move away from each other such that the opposing ends of the nozzle 1300 are splayed/spread apart to enable nozzle 1300 fit over the headband 1200 when in the stowed position. Preferably, the speaker assembly 1100 is arranged so that the revolution of the rigid outlet duct 1115 around the periphery of the speaker housing 1102 also causes the rigid outlet duct 1115 to roll around its longitudinal axis to further spread the opposing ends of the nozzle 1300. This spreading of the nozzle 1300 when revolved is advantageous as it allows the nozzle 1300 to be fit more closely to the user's face when in use and then expand as it moves into the stowed position to enable nozzle 1300 fit over the headband 1200.

In the illustrated embodiment, the rigid outlet duct 1115 is arranged so that it can revolve between a first end position and a second end position. In the first end position the rigid outlet duct 1115 is generally aligned with the air outlet 1104 of the speaker assembly 1100, as illustrated in FIG. 1a. Specifically, in the first end position, a first open end of the rigid outlet duct 1115 (i.e. that is proximal/adjacent to the air outlet 1104 of the speaker assembly 1100) is generally aligned with the air outlet 1104 of the speaker assembly 1100 such that any air flow emitted from the air outlet 1104 of the speaker assembly 1100 will pass into the rigid outlet duct 1115. In the second end position, the rigid outlet duct 1115 is generally parallel with the headband 1200 and will therefore not be aligned with the air outlet 1104 of the speaker assembly 1100, as illustrated in FIG. 1c. The purifier 1000 is therefore also provided with a sensor (not shown) that detects when the rigid outlet duct 1115 of one or both of the first speaker assembly 1100a and the second speaker assembly 1100b is not aligned with the corresponding air outlet 1104 and automatically turns off the motor 1110.

In order to allow for the position of the nozzle 1300 relative to the headband 1200 to be adjusted whilst maintaining the flow of purified air from the speaker assemblies 1100a, 1100b, the angular extension of the first open end of the rigid outlet duct 1115 is greater than that of the air outlet 1104 of the speaker assembly 1100. This allows the fluidic connection between the rigid outlet duct 1115 and the air outlet 1104 of the speaker assembly 1100 to be maintained even when the rigid outlet duct 1115 is revolved away from the first end position by a small angle/distance. For example, in the illustrated embodiment a central angle of the arcuate first open end of the rigid outlet duct 1115 is from 10 to 15 degrees greater than a central angle of the arcuate air outlet 1104 of the speaker assembly 1100.

In the illustrated embodiment, the first open end of the rigid outlet duct 1115 is provided with a flange (not shown) that projects around the periphery of the first open end of the rigid outlet duct 1115 and that is arranged to fit and slide within the arcuate slot defined between the arcuate inner side wall 1111c and an adjacent portion of the cylindrical outer side wall 1111b. The sliding of the rigid outlet duct 1115 within the arcuate slot therefore results in the revolution of the rigid outlet duct 1115 around a portion of the periphery of the speaker housing 1102 without any corresponding rotation of the impeller casing 1108.

The aperture formed in the cylindrical outer side wall 1111b that partially defines the air outlet 1104 therefore extends partially around the circumference of the speaker housing 1102 in order to define a track 1146 that guides the revolution of the rigid outlet duct 1115 around a portion of the periphery of the speaker housing 1102. The track 1146 is arranged so that as it extends from the first end position to the second end position it moves away from the earpad 1106 so that when the nozzle 1300 is rotated towards the headband 1200 the rigid outlet ducts 1115 that extend from each of the first speaker assembly 1100a and the second speaker assembly 1100b move away from each other. Consequently, this rotation of the nozzle 1300 towards the headband 1200 causes the opposing ends of the nozzle 1300 to splay/spread apart to enable nozzle 1300 fit over the headband 1200 when in the stowed position, as illustrated in FIG. 1c.

The generally frusto-conical speaker cover 1112 is then mounted on the speaker chassis 1111 over the entirety of the driver support plate 1111c such that the speaker/driver unit 1105 is covered by the speaker cover 1112. In the illustrated embodiment, the speaker cover 1112 is arranged so as to only cover the driver support plate 1111c, such that the peripheral portion of the base 1111a and the two arcuate circuit boards 1114a, 1114b mounted thereon are not covered by the speaker cover 1112, but such that the inner ends of the ports 1111e are covered by the speaker cover 1112. In the illustrated embodiment, the speaker cover 1112 is formed with a number of concave depressions or dimples 112a that increase the rigidity of the speaker cover 1112 to minimize vibration of the speaker cover 1112.

Figure 5F:
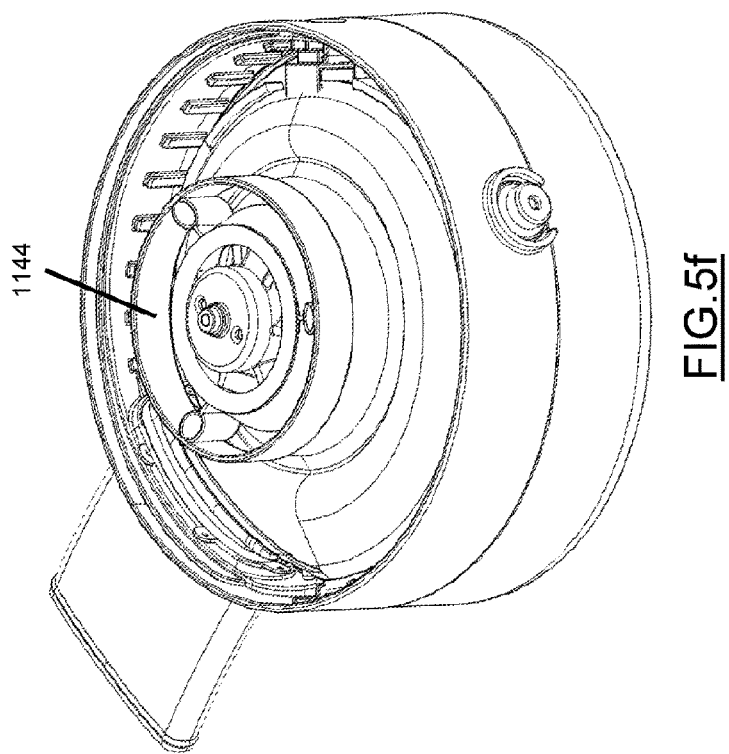
Figure 5E:
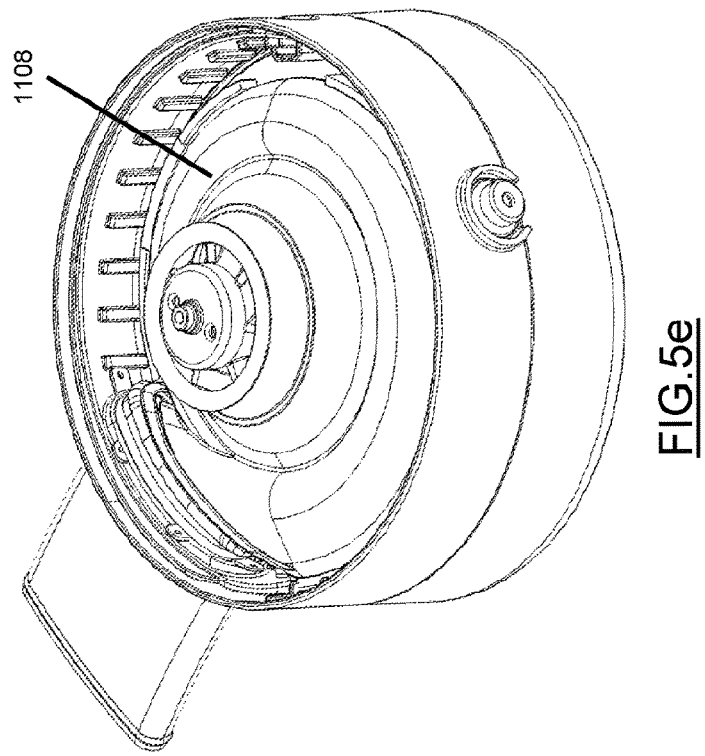

As shown in FIGS. 4, 5e and 5f, the generally frusto-conical impeller casing 1108 containing both the impeller 1109 and the motor 1110 is then disposed over the speaker cover 1112 so that speaker/driver unit 1105 is nested within a recess or cavity defined by a back/rear of the impeller casing 1108. The speaker cover 1112 and the speaker/driver unit 1105 are therefore both partially disposed within the recess defined by the back/rear of the impeller casing 1108.

Figure 6C:
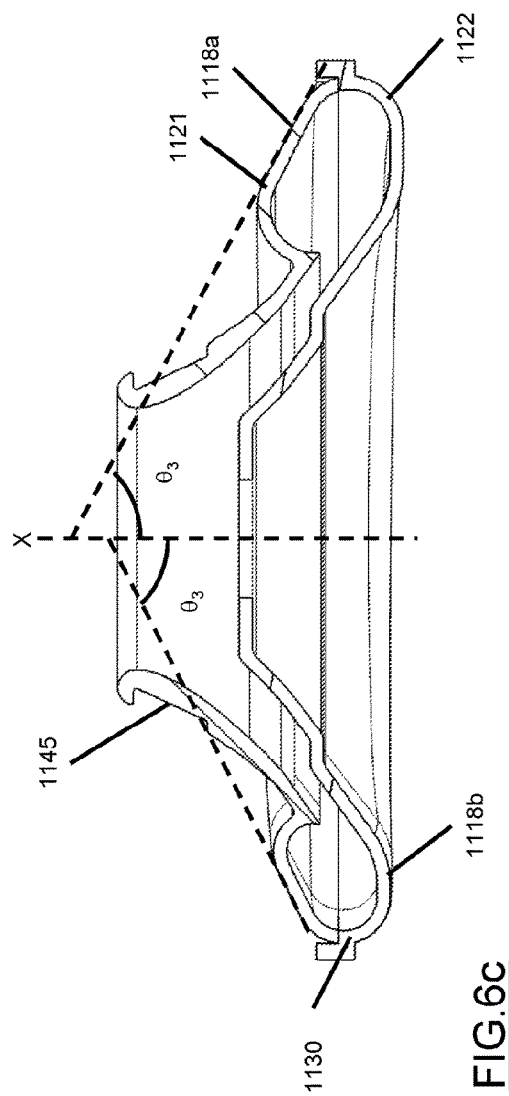
Figure 6D:
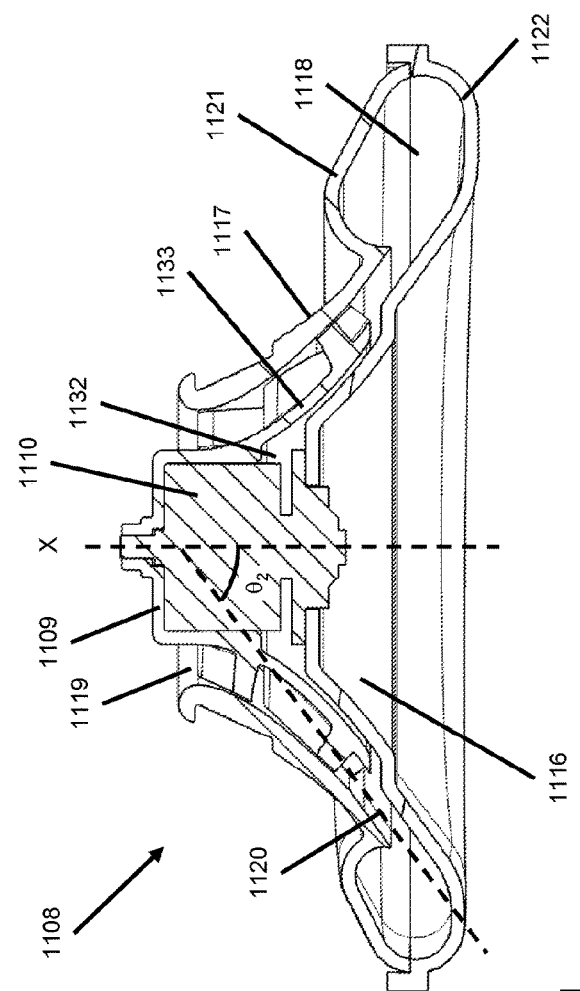

FIG. 6a shows a perspective view of the impeller casing 1108 without the impeller 1109 and the motor 1110, and FIG. 6b is a cross-sectional view of FIG. 6a. FIG. 6c is then a cross-sectional side view through the impeller casing 1108 without the impeller 1109 and the motor 1110, whilst FIG. 6d is a cross-sectional side view through the impeller casing 1108 with both the impeller 1109 and the motor 1110 disposed inside. The impeller casing 1108 is generally frusto-conical and the rear/back side of the impeller casing 1108 defines a generally frusto-conical recess 1116 having an open large diameter end and a closed small diameter end. The open large diameter end of the recess 1116 is proximate to the trailing edge of the impeller 1109 whilst the closed small diameter end of the recess 1116 is proximate to the leading edge of the impeller 1109.

Specifically, in the illustrated embodiment, the impeller 1109 is a mixed flow, unshrouded impeller, and the motor 1110 is disposed within the hub of the impeller 1109. The impeller casing 1108 then provides an impeller housing 1117 surrounding the impeller 1109 and the motor 1110, and a vaneless diffuser that fluidically connects a base of the impeller housing 1117 to an annular volute 1118 that is arranged to receive the air exhausted from the impeller housing 1117. The rear/back side of the impeller housing 1117 defines an inner portion of the generally frusto-conical recess 1116 and comprises the closed small diameter end of the recess 1116. The impeller housing 1117 is provided with an air inlet 1119 through which air can be drawn by the impeller 1109 and an air outlet 1120 through which the air is emitted from the impeller housing 1117 into the annular volute 1118. The air inlet 1119 of the impeller housing 1117 is provided by an aperture/opening at the small diameter end of the impeller housing 1117 and the air outlet 1120 is provided by an annular slot formed around a large diameter end or base of the impeller housing 1117. In the illustrated embodiment, the angle ($\theta_2$) between the air outlet 1120 of the impeller housing 1117 and a central axis (X) of the impeller housing 1117 is approximately 54 degrees; however, this angle ($\theta_2$) could be from 40 to 70 degrees, is preferably from 45 to 65 degrees, and is more preferably from 50 to 60 degrees.

The annular volute 1118 comprises a spiral (i.e. gradually widening) duct that is arranged to receive the air exhausted from the impeller housing 1117 and to guide the air to an air outlet 1131 of the volute 1118. The air outlet 1131 of the volute 1118 is then fluidically connected to the air outlet 1104 of the speaker assembly 1100. The term "volute" as used herein refers to a spiral funnel that receives the fluid being pumped by an impeller and increases in area as it approaches a discharge port. The air outlet 1131 of the volute 1118 therefore provides an efficient and quiet means for collecting the air that is exhausted from the circumferential annular slot that that forms the air outlet 1120 of the impeller housing 1117. In the illustrated embodiment, the annular volute 1118 comprises a partially planar front surface 1118a and an angle of the planar portion of the front surface 1118a of the volute relative to the central axis of the impeller housing 1117 is acute. The annular volute 1118 therefore has a non-circular cross-section. In the illustrated embodiment, the angle ($\theta_3$) between the planar portion of the front surface of the volute 1118 and the central axis (X) of the impeller housing 1117 is approximately 60 degrees; however, this angle ($\theta_3$) could be from 40 to 70 degrees, is preferably from 45 to 65 degrees, and is more preferably from 50 to 60 degrees. In the illustrated embodiment, the annular volute 1118 further comprises a partially planar rear/back surface 1118b wherein the planar portion of the rear/back surface 1118b is generally perpendicular to the central axis (X) of the impeller housing 1117.

In the embodiment illustrated in FIGS. 6a to 6d, the impeller casing 1108 comprises a front casing section 1121 that is attached to a rear/back casing section 1122, such that the impeller housing 1117 and the volute 1118 are integrally formed with one another. FIG. 6e therefore shows a perspective view of the rear/back casing section 1122, whilst FIG. 6f shows a perspective view of the front casing section 1121.

As shown in FIG. 6d, the impeller 1109 and the motor 1110 are disposed between the front casing section 1121 and the rear/back casing section 1122, such that the impeller 1109 and the motor 1110 are housed/accommodated within a space defined between the front casing section 1121 and the rear/back casing section 1122. The front casing section 1121 is therefore arranged to be disposed over a front of the impeller 1109 and the rear/back casing section 1122 is arranged to be disposed over the back of the impeller 1109 and the motor 1109. In particular, both the front casing section 1121 and the rear casing section 1122 have a generally frusto-conical shape with the front casing section 1121 being configured to fit closely over the front of the impeller 1109, whilst the rear casing section 1122 then generally conforms to the back of the impeller 1109 whilst also providing space to accommodate the motor 1110. The front casing section 1121 therefore also comprises the aperture that provides the air inlet 1119 of the impeller casing 1108, whilst the rear casing section 1122 forms the rear/back side of the impeller casing 1108 that defines the generally frusto-conical recess 1116.

As shown in FIG. 6e, the rear casing section 1122 is generally circular and comprises a generally frustoconical raised central portion 1123 that has a circular through hole 1124 provided at the centre. The rear casing section 1122 is also provided with a raised rim 1125 that extends around approximately three quarters of the periphery of the rear casing section 1122 such that there is a gap between a first end of the rim 1125 and an opposite, second end of the rim 1125. The raised central portion 1124 and the raised rim 1125 therefore define a depression or trough 1126 between them that spirals outwardly (i.e. gradually widens) towards an opening provided by the gap between the first end of the rim 1125 and the second end of the rim 1125.

As shown in FIG. 6f, the front casing section 1121 is also generally circular and comprises a generally frustoconical raised central portion 1127 that has a circular through-hole 1128 provided at the centre. The front casing section 1121 is then provided with an impression or indentation 1129 that spirals outwardly (i.e. gradually widens) around the raised central portion 1127 towards an opening provided by a gap in a rim 1130 formed around the periphery of the front casing section 1121 by the spiral indentation 1129. The rim 1130 extends around approximately three quarters of the periphery of the front casing section 1121, such that the gap is formed between a first end of the rim 1130 and an opposite, second end of the rim 1130.

As described above, the impeller housing 1117 formed by the front casing section 1121 and the rear casing section 1122 houses the impeller 1109 and the motor 1110. In the illustrated embodiment, the impeller 1109 and the motor 1110 are therefore housed within the impeller housing 1117 that is defined by the frustoconical raised central portion 1123 of the rear casing section 1122 and the frustoconical raised central portion 1127 of the front casing section 1121. The space between the frustoconical raised central portion 1123 of rear casing section 1122 and the frustoconical raised central portion 1127 of the front casing section 1121 is sufficient to house the impeller 1109 and the motor 1110, and is shaped so that the impeller 1109 is in close proximity to, but does not contact, an inner surface of the frustoconical raised central portion 1127 of the front casing section 1121. The centre of the frustoconical raised central portion 1123 of the rear casing section 1122 therefore provides a motor support seat upon which the motor 1110 is disposed, whilst the circular through-hole 1128 provided at the centre of the front casing section 1121 provides the air inlet 1119 through which air can be drawn into the impeller casing 1108 by the impeller 1109.

The gaps formed in the rims 1130, 1125 of the front casing section 1121 and the rear casing section 1122 respectively are then aligned with one another when the front casing section 1121 and the rear casing section 1122 are connected together so as to form the air outlet 1131 of the volute 1118, which is then fluidically connected to the air outlet 1104 of the speaker assembly 1100. In addition, when the front casing section 1121 and the rear casing section 1122 are connected together, the spiral depression 1126 formed in the rear casing section 1122 and the spiral impression 1129 formed in the front casing section 1121 together define the spiral duct of the volute 1118 that is arranged to receive the air exhausted from the impeller housing 1117 and to guide the air to the air outlet 1131 of the volute 1118.

As described above, the impeller 1109 is a mixed flow impeller that has a generally conical or frusto-conical shape. The impeller 1109 is hollow such that a rear/back side of the impeller 1109 defines a generally frusto-conical recess 1132 having an open large diameter end and a closed small diameter end. The open large diameter end of the recess 1132 is proximate to the trailing edge of the impeller 1109 whilst the closed small diameter end of the recess is proximate to the leading edge of the impeller 1109. The motor 1110 is then nested/disposed within the closed small diameter end of the recess 1132. Preferably, the impeller 1109 is a semi-open/semi-closed mixed flow impeller i.e. having a back shroud 1133 only. The back shroud 1133 of the impeller then defines the recess 1132 within which the motor 1110 is nested/disposed. In the illustrated embodiment, the motor 1110 is a DC brushless motor having a speed which is variable by the control circuit 1114.

In the illustrated embodiment, the angle between the trailing edge of the impeller 1109 and a central axis (X) of the impeller 1109 corresponds to/is the same as the angle ($\theta_2$) defined between the air outlet 1120 of the impeller housing 1117 and the central axis (X) of the impeller housing 1117. The angle ($\theta_2$) between the trailing edge of the impeller 1109 and the central axis (X) of the impeller 1109 is therefore approximately 54 degrees; however, this angle ($\theta_2$) could be from 40 to 70 degrees, is preferably from 45 to 65 degrees, and is more preferably from 50 to 60 degrees.

In the illustrated embodiment, the back shroud 1133 of the impeller 1109 is curved so that it widens or flares outwardly from the leading edge to the trailing edge. In particular, in the illustrated embodiment, the closed small diameter end of the back shroud 1133 of the impeller 1109 is generally cylindrical in shape so that this fits closely over the generally cylindrical motor 1110. Consequently, the portion of the back shroud 1133 of the impeller 1109 that is adjacent to the closed small diameter end is generally parallel with the central axis (X) of the impeller 1109 so as to define a generally cylindrical small diameter end. The back shroud 1133 of the impeller 1109 then curves outwardly so that angle of the back shroud 1133 of the impeller 1109 relative to the central axis (X) gradually increases towards the trailing edge of the impeller 1109.

The impeller casing 1108 is then supported/suspended within the speaker housing 1102 by a plurality of resilient supports 1134 that reduce the transmission of vibrations from the impeller casing 1108 to the speaker housing 1102. To do so, the plurality of resilient supports 1134 each comprise a resilient material such as an elastomeric or rubber material. In the illustrated embodiment, the only direct connection between the speaker housing 1102 and the impeller casing 1108 is provided by the resilient supports 1134.

In the illustrated embodiment, the plurality of resilient supports 1134 comprise three lower resilient supports 1134*a*, 1134*b* and three upper resilient supports 1134*c*. The three lower resilient supports 1134*a*, 1134*b* extend radially between an inner surface/side wall of the speaker housing 1102 and an outer surface of the impeller casing 1108. Specifically, the three lower resilient supports 1134*a*, 1134*b* extend radially between an inner surface/side wall of the speaker housing 1102 and an outer peripheral surface of the annular volute 1118. The three upper resilient supports 1134*a*, 1134*b* then extend radially between an outer surface of the impeller casing 1108 and a lower surface of the filter assembly 1107 that is disposed over the impeller casing 1108, and which will be described in more detail below.

Two of the three lower resilient supports then each comprise a radially damping profile damper 1134*a*. The term "profile damper" as used herein refers to a device that is arranged to dissipate kinetic energy and particularly vibrations by deformation of the profile of the device. A radially damping profile damper is therefore a profile damper that is arranged to deform radially, whilst an axially damping profile damper is a profile damper that is arranged to deform axially.

Figure 7:
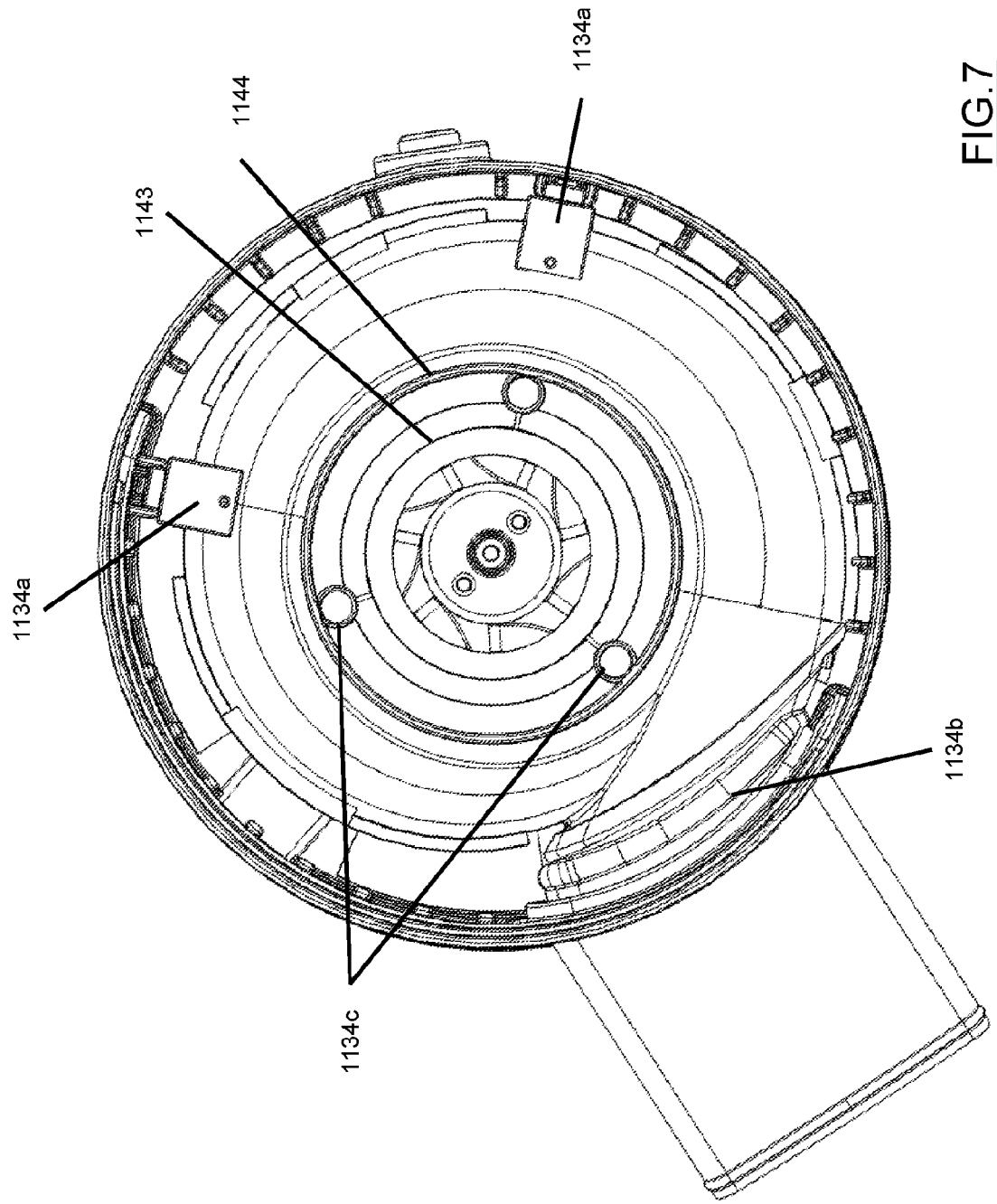
FIG. 7 is a top view of the impeller casing mounted within a speaker housing.
Figure 8:
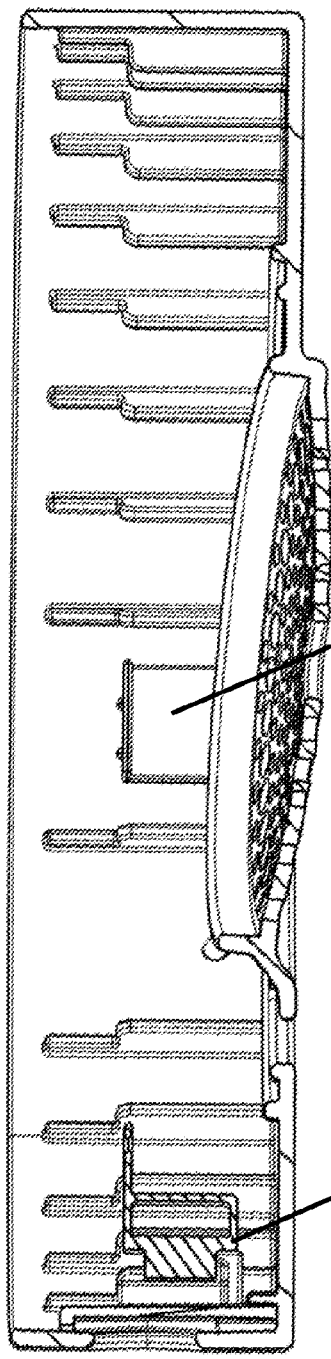
FIG. 8 is cross-sectional view of a speaker chassis of the speaker assembly of FIGS. 3a and 3b.

As illustrated in FIGS. 7 and 8, each radially damping profile damper 1134*a* comprises a tube of resilient material that is connected/attached to an inner surface/side wall of the speaker housing 1102 and that then presses/compresses against an outer surface of the impeller casing 1108. In particular, the tube of resilient material is connected/attached to an inner surface/side wall of the speaker housing 1102 at a first location on an outer surface the tube and then presses/compresses against an outer surface of the impeller casing 1108 at a diametrically opposed, second location on the outer surface of the tube. In the illustrated embodiment, each radially damping profile damper 1134*a* comprises a non-circular tube of resilient material that has a rectangular cross section; however, each profile damper could alternatively comprise a tube of resilient material having a circular or other quadrilateral cross section.

Figure 9:
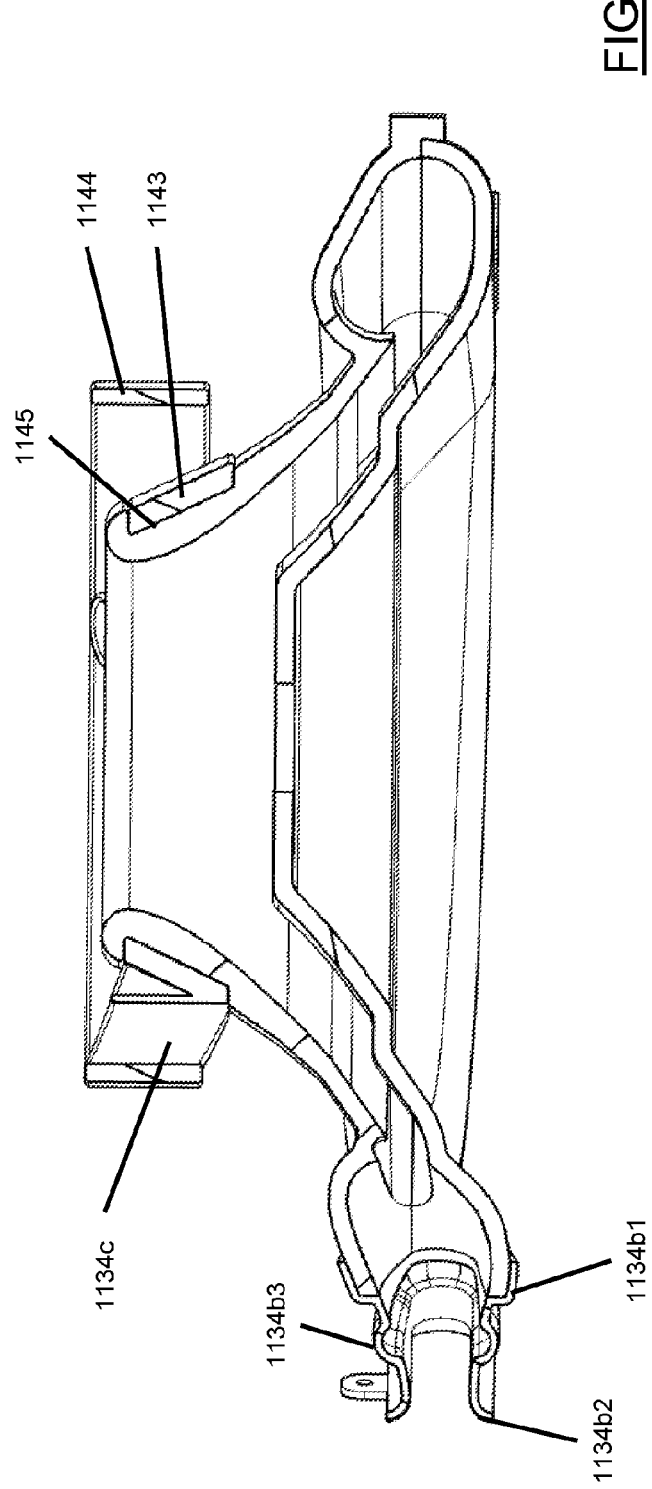
FIG. 9 is cross-sectional view of the impeller casing of FIG. 6a with resilient supports.

As illustrated in FIGS. 7 and 9, the third of the lower resilient supports is then provided by a resilient duct 1134*b* that is sealed around the air outlet 1131 of the impeller casing 1108 (e.g. is sealed to or against a surface surrounding the air outlet 1131 of the impeller casing 1108) and extends from the air outlet 1131 of the impeller casing 1108 towards the air outlet 1104 of the speaker housing 1102. The resilient duct 1134*b* then also forms a seal around the air outlet 1104 of the speaker housing 1102 so that the airflow generated by impeller 1109 is conveyed from the impeller casing 1108 and out through the air outlet 1104 of the speaker housing 1102. In the illustrated embodiment, the resilient duct 1134*b* comprises a connecting portion 1134*b*1 that is connected around the air outlet 1131 of the impeller casing 1108 and a skirt portion 1134*b*2 that is arranged to contact the surface surrounding the air outlet 1104 of the speaker housing 1102 to form the seal around the air outlet 1104 of the speaker housing 1102. In addition, the resilient duct 1134*b* further comprises a damping portion 1134*b*3 that is configured to further reduce the transmission of vibrations from the impeller casing 1108 to the speaker housing 1102. This damping portion 1134*b*3 comprises an integral axially damping profile damper that is provided by a bulge or dilation formed around a circumference of the resilient duct 1134*b*.

The filter assembly 1107 is then mounted to the speaker chassis 1111 so that the filter assembly 1107 is provided upstream of the impeller 1109 and is arranged to be nested over the impeller casing 1108. The filter assembly 1107 comprises a filter seat 1135 supporting one or more filter elements 1136, 1137. The filter seat 1135 is provided with a plurality of apertures 1138 that allow air to pass from a front surface of the filter seat 1135 to a rear/back surface of the filter seat 1135, with the front surface being arranged to support the filter elements 1136, 1137 over the plurality of apertures 1138. The filter seat 1135 then further defines an air passageway or channel 1139 between the rear/back surface of the filter seat 1135 and the air inlet 1119 of the impeller casing 1108 that is arranged to guide air to the air inlet 1119 of the impeller casing 1108. This air passageway 1139 is provided by a cavity defined between the rear/back surface of the filter seat 1135 and a front surface of the impeller casing 1108. Air must therefore pass through the filter elements 1136, 1137 before it can pass through the apertures 1138 in the filter seat 1135 and into the air passageway 1139 that leads to the air inlet 1119 of the impeller casing 1108.

In the illustrated embodiment, the filter seat 1135 is mounted to the speaker chassis 1111 and located over the impeller housing 1117, with the impeller housing 1117 partially disposed within a volume defined by a back of the filter seat 1135. In particular, the filter seat 1135 comprises a generally frusto-conical peripheral portion 1135*a* and a generally cylindrical central portion 1135*b*. The generally frusto-conical peripheral portion 1135*a* of the filter seat 1135 is provided with the plurality of apertures 1138 and is arranged to support one or more generally frusto-conical filter elements 1136, 1137 over the plurality of apertures 1138. The impeller housing 1117 is then at least partially disposed within the generally cylindrical central portion 1135*b* of the filter seat 1135. In particular, the air inlet 1119 of impeller housing 1117 is disposed within a volume defined by a back of the cylindrical central portion 1135*b* of the filter seat 1135.

Figure 10A:
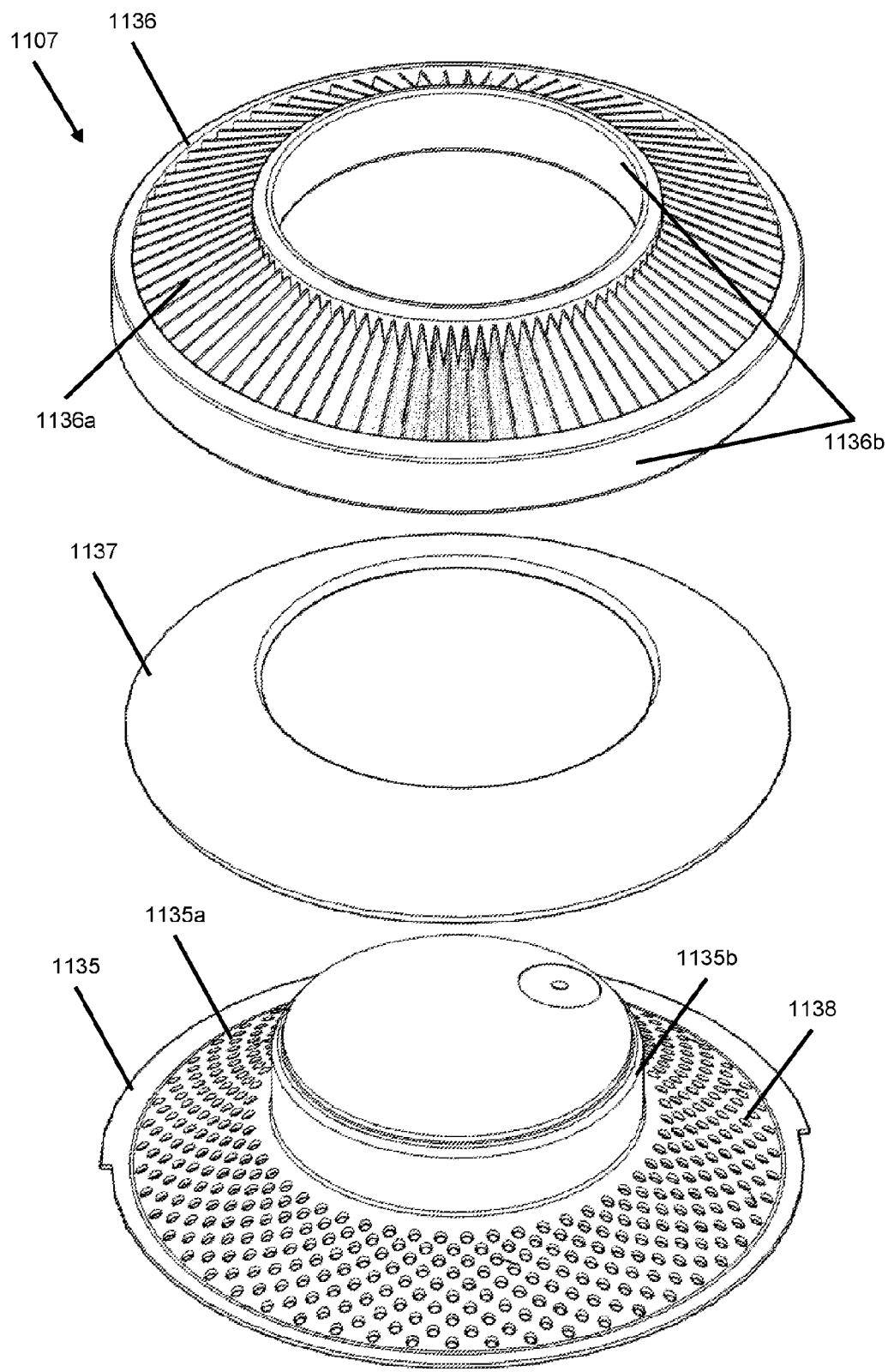
FIG. 10a is an exploded view of a filter assembly of the speaker assembly of FIGS. 3a and 3b.
Figure 10B:
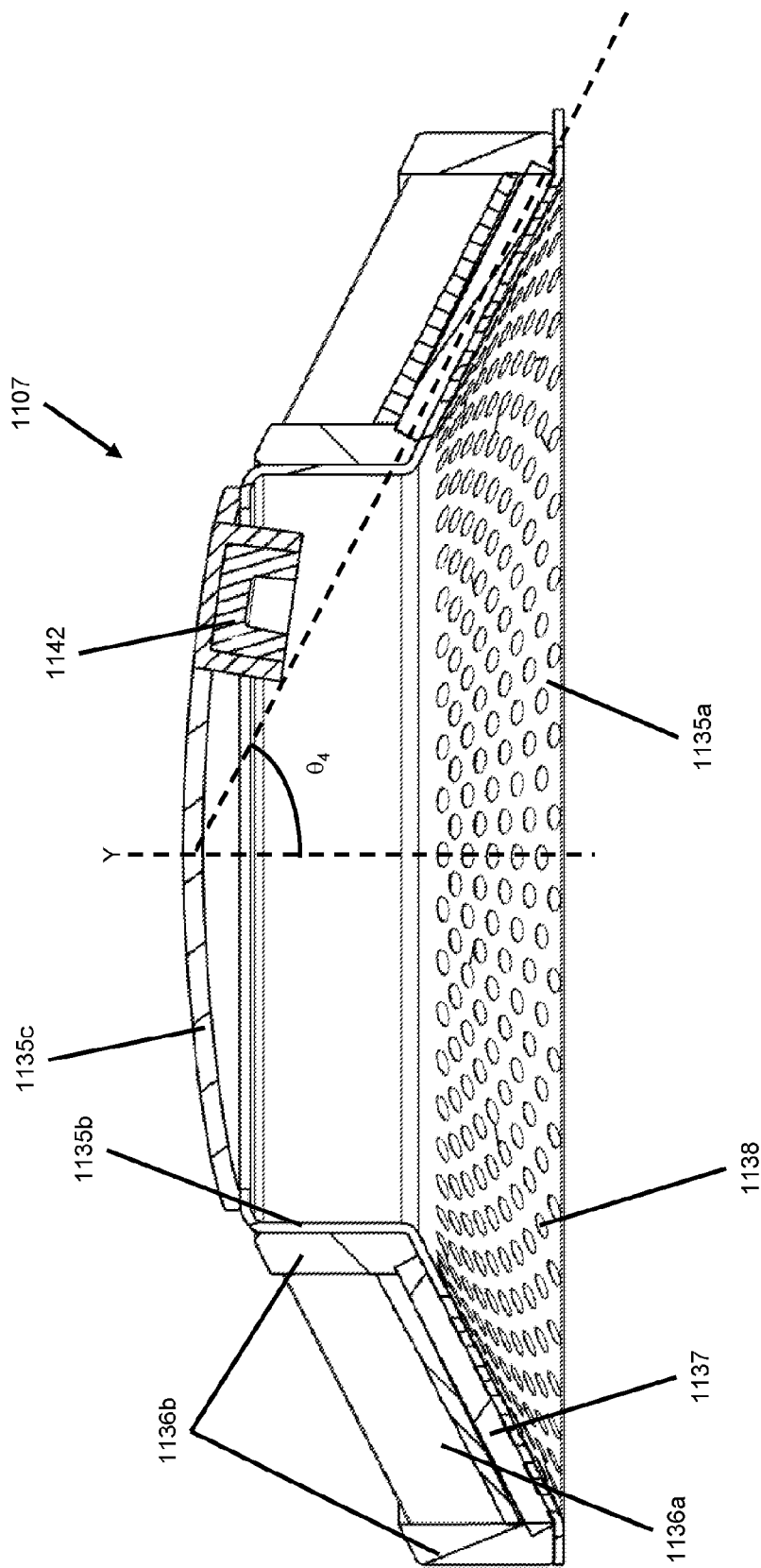

As shown in FIGS. 10*a* and 10*b*, the generally frusto-conical filter elements 1136, 1137 are arranged to fit over and be supported upon the filter seat 1135. To do so, the one or more generally frusto-conical filter elements 1136, 1137 are open. In other words, the filter elements 1136, 1137 are provided as hollow frustacones with open ends, such that the filter elements 1136, 1137 each have an open large diameter end and an open small diameter end that forms a central opening in the filter elements 1136, 1137. In addition, the angle ($\theta_4$) between the frusto-conical peripheral portion 1135*a* and the central axis (Y) of the filter seat 1135 is the same as the angle ($\theta_4$) between the upper and lower surfaces of each of the generally frusto-conical filter elements 1136, 1137 and the central axis (Y) of the generally frusto-conical filter elements 1136, 1137.

In the illustrated embodiment, the angle ($\theta_4$) between the frusto-conical peripheral portion 1135*a* and the central axis (Y) of the filter seat 1135 is approximately the same as the angle ($\theta_3$) between the planar portion of the front surface of the volute 1118 and the central axis (X) of the impeller housing 1117. Consequently, the angle ($\theta_4$) between the frusto-conical peripheral portion 1135*a* and the central axis (Y) of the filter seat 1135 is approximately 60 degrees;

however, this angle ($\theta_4$) could be from 40 to 70 degrees, is preferably from 45 to 65 degrees, and is more preferably from 50 to 60 degrees.

In the illustrated embodiment, the filter assembly 1107 comprises both a particulate filter element 1136 and a chemical filter element 1137, with the particulate filter element 1136 located upstream relative to the chemical filter element 1137. The generally frusto-conical particulate filter element 1136 comprises a pleated particulate filter media 1136a that is arranged to be frustoconical in shape with the pleats/folds of the pleated filter media 1136a at an acute angle ($\theta_4$) relative to a central axis (Y) of the particulate filter element 1136 and both the inner and outer ends/edges of the pleated filter media 1136a parallel to the central axis (Y) of the particulate filter element 1136. The entirety of both ends/edges of the pleated filter media 1136a are then disposed within a seal 1136b of resilient material that extends parallel to the central axis (Y) of the particulate filter element 1136. For example, the resilient material could be any of synthetic rubber, polyurethane, silicone rubber, ethylene-vinyl acetate (EVA), polyolefins (PO) etc.

As shown in FIGS. 3a, 3b and 4, the speaker housing 1102 further comprises an outer cover 1140 that is mounted onto the speaker chassis 1111. This outer cover 1140 is arranged to fit over (and therefore generally conforms to) the filter assembly 1107 and is provided with an array of apertures 1141 that allow air to pass through the outer cover 1140 and that therefore define an air inlet of the outer cover 1140. These apertures 1141 are sized to prevent larger particles from passing through to the filter assembly 1107 and blocking, or otherwise damaging, the filter elements 1136, 1137. Alternatively, in order to allow air to pass through, the outer cover 1140 could comprise one or more grilles or meshes mounted within windows in the outer cover 1140. It will also be clear that alternative patterns of arrays are envisaged within the scope of the present invention.

The outer cover 1140 is releasably attached to the speaker chassis 1111 so as to cover the filter assembly 1107. For example, the outer cover 1140 could be attached to the speaker chassis 1111 using cooperating screw threads provided on the outer cover 1140 and the speaker chassis 1111 and/or using some catch mechanism. When mounted on speaker chassis 1111, the outer cover 1140 protects the filter elements 1136, 1137 from damage, for example during transit, and also provides a visually appealing outer surface covering the filter assembly 1107, which is in keeping with the overall appearance of the purifier 1000. In addition, the outer cover 1140 is arranged such that, when attached to the speaker chassis 1111, the outer cover 1140 compresses the resilient edge seals 1136b that encompass the ends/edges of the pleated filter media 1136a of the particulate filter element 1136 against the filter seat 1135. The compression of these edge seals 1136b prevents air from reaching the apertures 1138 provided in the filter seat 1135 without first passing through the filter elements 1136, 1137.

In the illustrated embodiment, the outer cover 1140 is provided as a hollow frustacone with open ends. The open large diameter end of the outer cover 1140 is arranged to fit over the periphery of the large diameter end of the filter assembly 1107, whilst the open small diameter end of the outer cover 1140 is arranged fit over both the periphery of the small diameter end of the filter assembly 1107 and the generally cylindrical central portion 1135b of the filter seat 1135. A circular front surface 1135c of the generally cylindrical central portion 1135b of the filter seat 1135 is therefore exposed within the open small diameter end of the outer cover 1140 and thereby forms a portion of the outer surface of the speaker assembly 1100. Preferably, the circular front surface 1135c of the filter seat 1135 is transparent and thereby forms a window through which the user to see the spinning of the impeller 1109 through the air inlet 1119 of the impeller casing 1108. This allows the user to visually check the speed of the impeller 1109 and to confirm that the impeller 1109 is functioning appropriately.

In addition, in the illustrated embodiment a feedforward microphone 1142 for active noise cancellation (ANC) is provided on the inner surface of the circular front surface 1135c of the filter seat 1135. The feedforward microphone 1142 is arranged to provide data to the control circuit 1114, with the control circuit 1114 then being configured to implement active noise cancellation (ANC) when controlling the speaker/driver unit 1105. For active noise cancellation (ANC) applications, a feedforward microphone is provided towards the exterior of the speaker assembly in order to detect any background or ambient noise so that this can be cancelled out using the sound generated by the speaker. A feedforward microphone is therefore often referred to as a reference microphone. Providing the speaker assembly 1100 with a feedforward microphone 1142 is particular useful, as it provides that noise generated by the motor 1110 and/or the impeller 1109 can be detected by the feedforward microphone 1142 and cancelled out along with any other unwanted background or ambient noise. When both a feedback microphone 1113 and a feedforward microphone 1142 are present, it is possible to combine both the feedforward and feedback approaches and implement hybrid ANC, which exhibits a synergistic performance improvement over the independent feedforward and feedback approaches.

As described above, the impeller casing 1108 is supported/suspended within the speaker housing 1102 by a plurality of resilient supports 1134 that, in the illustrated embodiment, comprise three lower resilient supports 1134a, 1134b and three upper resilient supports 1134c. The three upper resilient supports 1134c extend radially between an outer surface of the impeller casing 1108 and a rear/back surface of the filter assembly 1107 that is disposed over the impeller casing 1108.

The three upper resilient supports 1134c each comprise a radially damping profile damper. Each of these radially damping profile dampers 1134c comprises a tube of resilient material that is mounted between the outer surface of the impeller casing 1108 and the lower/inner surface of the filter assembly 1107. In the illustrated embodiment, each radially damping profile damper 1134c comprises a tube of resilient material that has a circular cross section; however, each profile damper could alternatively comprise a tube of resilient material having a non-circular cross section.

In the illustrated embodiment, each of the tubes 1134c of resilient material is connected between an inner collar/ring 1143 that is disposed over the front surface of the impeller casing 1108 and an outer collar/ring 1144 that contacts the rear/back surface of the filter assembly 1107. In particular, each tube of resilient material 1134c is connected to the inner ring 1143 at a first location on a periphery of the tube and connected to the outer ring 1144 at a diametrically opposed, second location on the periphery of the tube. The inner ring 1143 is disposed within a recess 1145 formed around the periphery of the impeller casing 1108, specifically around the periphery of the frustoconical raised central portion 1127 of the impeller casing 1108, and is thereby retained on the front surface of the impeller casing 1108. The recess 1145 is configured to receive and contain at least a substantial proportion of the inner ring 1143 so that this does not obstruct the flow of air through the air passageway 1139.

A hollow nozzle 1300 is then attached to both the first speaker assembly 1100a and the second speaker assembly 1100b and is arranged so that it can receive both the filtered airflow generated by the first speaker assembly 1100a and the filtered airflow generated by the second speaker assembly 1100b. The air purifier 1000 is therefore arranged so that the attached nozzle 1300 can be fluidically connected to both the air outlet 1104a of the first speaker assembly 1100a and the air outlet 1104b of the second speaker assembly 1100b.

Figure 11:
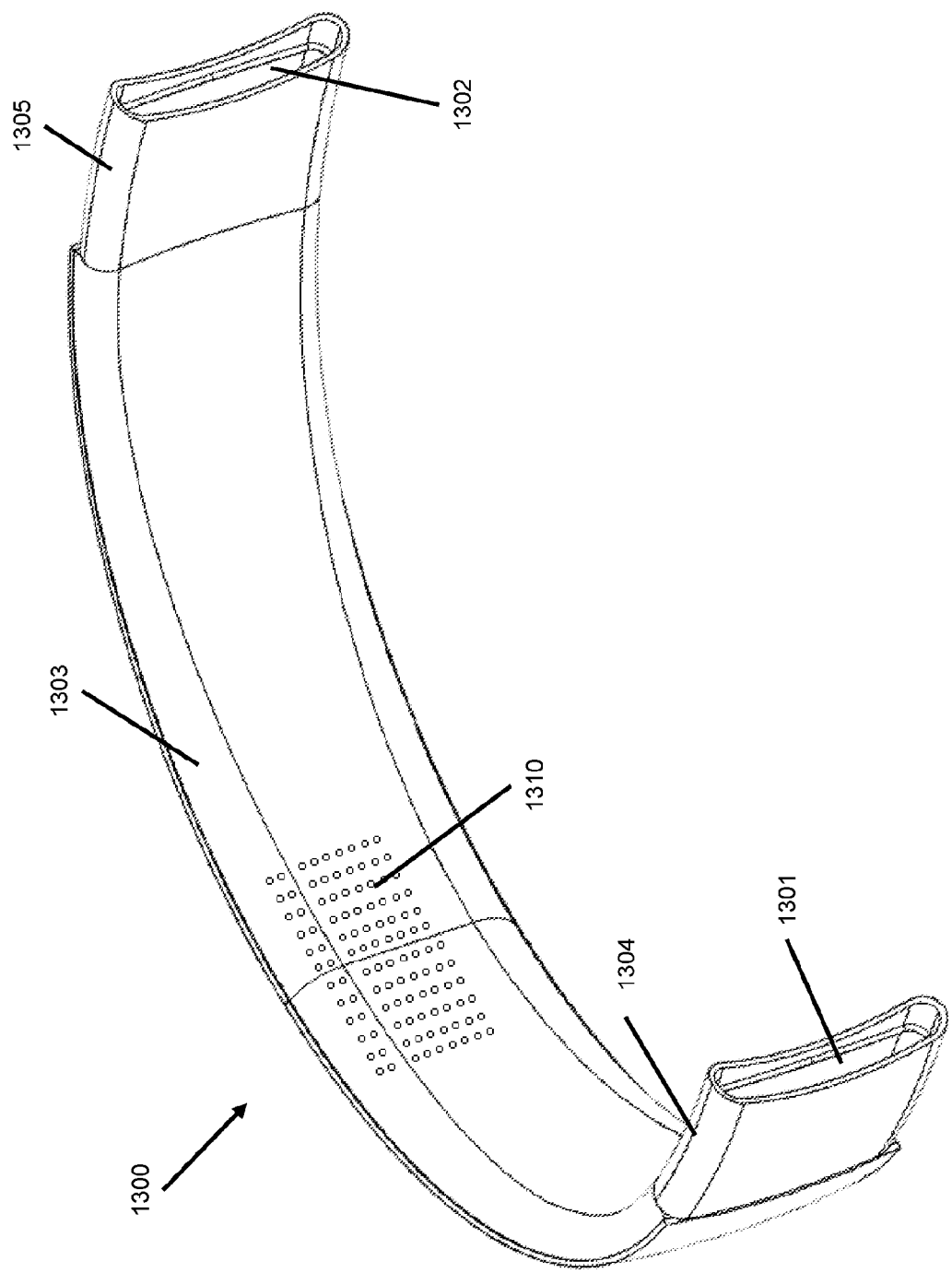

FIG. 11 shows a perspective view of the nozzle 1300 when detached from the speaker assemblies 1100a, 1100b. In the illustrated embodiment, the nozzle 1300 essentially comprises an elongate, hollow tube that is arranged so that it can be fluidically connected between the air outlet 1104a of the first speaker assembly 1100a and the air outlet 1104b of the second speaker assembly 1100b, with a first air inlet or ingress port 1301 being provided by a first open end of the nozzle 1300 and a second air inlet or ingress port 1302 being provided by an opposite, second open end of the nozzle 1300. The first air inlet or ingress port 1301 of the nozzle 1300 is therefore arranged to be able to receive the filtered airflow emitted from the air outlet 1104a of the first speaker assembly 1100a and the second air inlet or ingress port 1302 of the nozzle 1300 is arranged to be able to the receive the filtered airflow emitted from the air outlet 1104b of the second speaker assembly 1100b.

As shown in FIGS. 1a to 1c, the first open end 1301 of the nozzle 1300 is connected to the rigid outlet duct 1115 that extends from the speaker housing 1102 of the first speaker assembly 1100a. The nozzle 1300 then extends away from the first speaker assembly 1100a and assumes an arcuate shape so that the opposite, second end 1302 of the nozzle 1300 connects to the rigid outlet duct 1115 that extends from the speaker housing 1102 of the second speaker assembly 1100b. It is therefore preferable that at least a portion of the nozzle 1300 is formed of a flexible/resilient material so that the nozzle 1300 can bend and flex as the first and second speaker assemblies 1100a, 1100b move relative to one another. For example, in the illustrated embodiment, a central portion 1303 (i.e. a portion located around the midpoint of the length of the nozzle 1300) is made from a flexible, transparent plastic such as a polyurethane, whilst the two end portions 1304, 1305 are each made from a rigid, transparent plastic such as a polyethylene terephthalate glycol-modified (PETG). Alternatively, the entire nozzle 1300 could be formed from one or more flexible/resilient materials.

As described above, in the illustrated embodiment, the rigid outlet ducts 1115 are arranged so that they can revolve between a first end position in which a first open end of the rigid outlet duct 1115 is aligned with the air outlet 1104 of the corresponding speaker assembly 1100 and a second end position in which the rigid outlet duct 1115 is not aligned with the air outlet 1104 of the speaker assembly 1100. The attached nozzle 1300 can therefore move between a first end position in which it is fluidically connected to both the air outlet 1104a of the first speaker assembly 1100a and the air outlet 1104b of the second speaker assembly 1100b and a second end position in which it is not fluidically connected to either the air outlet 1104a of the first speaker assembly 1100a or the air outlet 1104b of the second speaker assembly 1100b.

The nozzle 1300 is arranged such that, when the purifier 1000 is worn by a user with the first speaker assembly 1100a over a first ear of the user and the second speaker assembly 1100b over a second ear of the user and with the nozzle 1300 in the first end position, the nozzle 1300 will extend around a face of the user, from one side to the other, and in front of a mouth of the user. In particular, the nozzle 1300 extends around the jaw of the user, from adjacent to one cheek to adjacent the other cheek, without making contact with the mouth, nose or surrounding regions of the user's face. It is therefore preferable that the at least a portion of the nozzle 1300 is formed of a transparent or partially transparent material so that the user's mouth is visible through the nozzle 1300 so as to avoid limiting the user's ability to clearly speak to others. For example, in the illustrated embodiment, the central portion 1303 is made from a flexible, transparent plastic such as a polyurethane, whilst the two end portions 1304, 1305 are each made from a stiff, transparent plastic such as a polyethylene terephthalate glycol-modified (PETG). Alternatively, the entire nozzle 1300 could be formed from a single transparent or partially transparent material.

The air purifier 1000 is arranged to so that, when in the first end position, the nozzle 1300 will extend away from the air outlets 1104a, 1104b of the speaker assemblies 1100a, 1100b at an angle ($\theta_1$) of from 95 to 115 degrees relative to the headband 1200 (i.e. such that the angle between a plane that is parallel to the length of the nozzle and the plane that is parallel to the length of the arcuate headband is from 95 to 115 degrees). In this regard, it has been found that an angle from 95 to 115 degrees is appropriate for locating the nozzle 1300 in front of at least the mouth of the user when the purifier 1000 is worn by a user with the first speaker assembly 1100a over a first ear of the user and the second speaker assembly 1100b over a second ear of the user. The mounting projections 1101 and the air outlets 1104 of the speaker assemblies 1100 are therefore located so that the angle ($\theta_1$) between the headband 1200 and the nozzle 1300 is within the range of 95 to 115 degrees In order to achieve a desired pressure drop within the nozzle 1300, the cross-sectional area of an interior passage 1306 defined by the hollow nozzle 1300 is preferably from 150 mm$^2$ to 170 mm$^2$, and is preferably around 160 mm$^2$. In addition, it is preferable that the height (H) of the nozzle 1300 is from 35 to 65 mm, and is more preferably from 40 to 60 mm in order to ensure that the nozzle 1300 will adequately deliver air to the user's mouth and nose whilst also providing protection from external airflows. Consequently, the height of the nozzle 1300 may vary along its length provided that at least the portion of the nozzle 1300 that extends around a face of the user from one side to the other has a minimum height from 35 to 65 mm. In this regard, the height of the nozzle 1300 is the distance between a top edge and a bottom edge of the nozzle 1300, wherein the top edge is that which faces generally upwards when the headband 1200 is worn on the head of a user and the bottom edge is that which faces generally downwards when the headband 1200 is worn on the head of a user.

As shown in FIG. 2, the nozzle 1300 has a generally D-shaped cross-section comprising a generally flat first outer surface 1307 and a second outer surface 1308 that comprises a generally flat mid-portion and edge portions that curve to meet the edges of the first outer surface 1307. When connected between the first speaker assembly 1100a and the second speaker assembly 1100b, the first outer surface 1307 faces outwardly away from the first speaker assembly 1100a and the second speaker assembly 1100b, whilst the second outer surface 1308 faces inwardly towards the first speaker assembly 1100a and the second speaker assembly 1100b.

The nozzle 1300 is provided with an air outlet 1310 for emitting/delivering the filtered air to a user. In the illustrated embodiment, the air outlet 1310 of the nozzle 1300 comprises an array of apertures formed in a section of the nozzle 1300, with these apertures extending from the interior passage 1306 defined by the nozzle 1300 to an exterior surface of the nozzle 1300. Alternatively, the air outlet 1310 of the nozzle 1300 may comprise one or more grilles or meshes mounted within windows in the nozzle 1300. It will also be clear that alternative patterns of air outlet arrays are envisaged within the scope of the present invention.

The array of apertures that provide the air outlet 1310 are formed in a section of the nozzle 1300 that is centred at the centre of the second outer surface 1308 of the nozzle 1300 that faces towards the speaker assemblies 1100a, 1100b. The apertures are therefore only present in in a section of the nozzle 1300 that, when the purifier 1000 is worn by a user, faces towards the mouth and nose of the user. In the illustrated embodiment, the section of the nozzle 1300 that is provided with the array of apertures extends at least partially over the generally flat mid-portion of the second outer surface 1308 of the nozzle 1300 and partially over one of curved edge portions of the second outer surface 1308.

In use, the purifier 1000 is worn by a user with the first speaker assembly 1100a over a first ear of the user and the second speaker assembly 1100b over a second ear of the user such that, when in the first end position, the nozzle 1300 will extend around a face of the user, from one ear to the other, and over at least the mouth of the user. Within each speaker assembly 1100a, 1100b, the rotation of the impeller 1109 by the motor 1110 will cause an airflow to be generated through the impeller casing 1108 that draws air into the speaker assembly 1100 through the apertures 1141 in the outer cover 1140. This flow of air will then pass through the filter elements 1136, 1137 disposed between the outer cover 1140 and the filter seat 1135 thereby filtering and/or purifying the airflow. The resulting filtered airflow will then pass through the apertures 1138 provided in the frustoconical portion 1135a of the filter seat 1135 into the air passageway 1139 provided by the space between the impeller casing 1108 and the opposing surface of the filter seat 1135, with the air passageway 1139 then guiding the airflow to the air inlet 1119 of the impeller casing 1108. The impeller 1109 will then force the filtered airflow out through the annular slot that provides the air outlet 1120 of the impeller housing 1117 and into the volute 1118 of the impeller casing 1108. The volute 1118 then guides the filtered airflow through the air outlet 1104 of the speaker assembly 1100 and into the nozzle 1300 through an air inlet 1301, 1302 provided by one of the open ends of the nozzle 1300.

As the first open end of the nozzle 1300 providing the first air inlet 1301 is connected to the first speaker assembly 1100a and the second open end of the nozzle 1300 providing the second air inlet 1302 is connected to the second speaker assembly 1100b, a first filtered airflow generated by the first speaker assembly 1100a and a second filtered airflow generated by the second speaker assembly 1100b will enter the nozzle 1300 from opposite ends. The first and second filtered airflows will therefore travel in opposite directions within the interior passage 1306 of the nozzle 1300 until they collide in the vicinity of/towards the centre of the nozzle 1300 (i.e. the midpoint of the length of the nozzle 1300). The collision between the first filtered airflow and the second filtered airflow will cause both airflows to change direction and will result in the formation a combined filtered airflow that is directed out through the apertures formed in the nozzle 1300 that provide the air outlet 1310 and towards the mouth and nose of the user.

The head wearable air purifier therefore provides a nozzle that blocks most, if not all, unfiltered ambient or external airflows from reaching the user's mouth and nose area. In doing so, not only does the head wearable air purifier reduce the volume of unfiltered air that is inhaled by the user's but it also prevents these external airflows from interfering with the airflow delivered by the air purifier, which would otherwise hinder the effective delivery of the purified airflow to the user. In addition, in embodiments in which at least a portion of the nozzle is formed of a transparent material the head wearable air purifier assembly also provides that, despite covering the user's mouth so as to block unfiltered external or ambient airflows, the user's mouth is still visible through the nozzle so as to avoid limiting the user's ability to clearly speak to others.

Furthermore, the use of single nozzle that causes the two air flows of purified air to collide to thereby generate a combined airflow that is directed to the user does away with the need for the nozzle to be provided with structures (e.g. vanes, baffles etc.) within the interior passage of the nozzle that would otherwise be necessary in order to change the direction of the airflow. Providing such structures within the nozzle reduces the pressure of the airflow that can be delivered to the user and limits the potential for transparency of the nozzle.

Moreover, by making use of two separate purifiers, one in each speaker, to deliver purified airflows into each end of the nozzle, the head wearable air purifier described herein does away with the need for any additional ducting that would otherwise be necessary if a single air purifier were to be used to deliver both airflows into the nozzle. Additionally, using two separate purifiers, one in each speaker, provides that each purifier can be made as small as possible, so as to be suitable to be comfortably incorporated into headphones, without sacrificing performance. In particular, using two separate purifiers provides an improved flow rate and improved filtering efficiency due to the increase in available filter area.

In a preferred embodiment, the control circuit 1114 of the speaker assemblies 1100a, 1100b is arranged to control a rotational speed of the motor 1110 such that the maximum rotational speed of the impeller 1109 is from 9000 to 18,000 RPM, is preferably from 10,000 to 14,000 RPM, and is more preferably from 10,000 to 12,000 RPM. These ranges of rotational speeds equate to frequency ranges that it has been found can be effectively cancelled by a typical active noise cancellation (ANC) system thereby improving the extent to which noise generated by the motor 1110 and/or the impeller 1109 can be cancelled out. However, limiting the maximum rotational speed of motor 1110 and the impeller 1109 to within these ranges also places limitations on the size of the impeller 1109 that must be used in order to generate an air flow having a sufficient flow rate.

Figure 12:
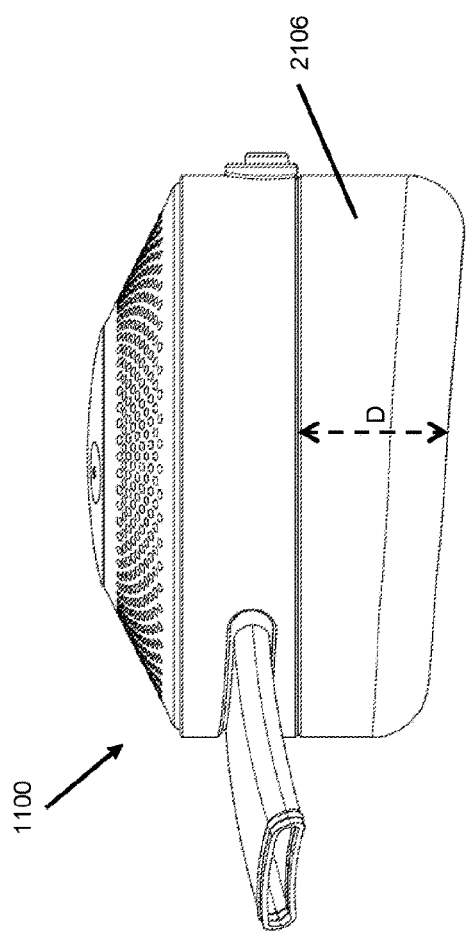
FIG. 12 is a side view of an alternative speaker assembly.
Figure 13:
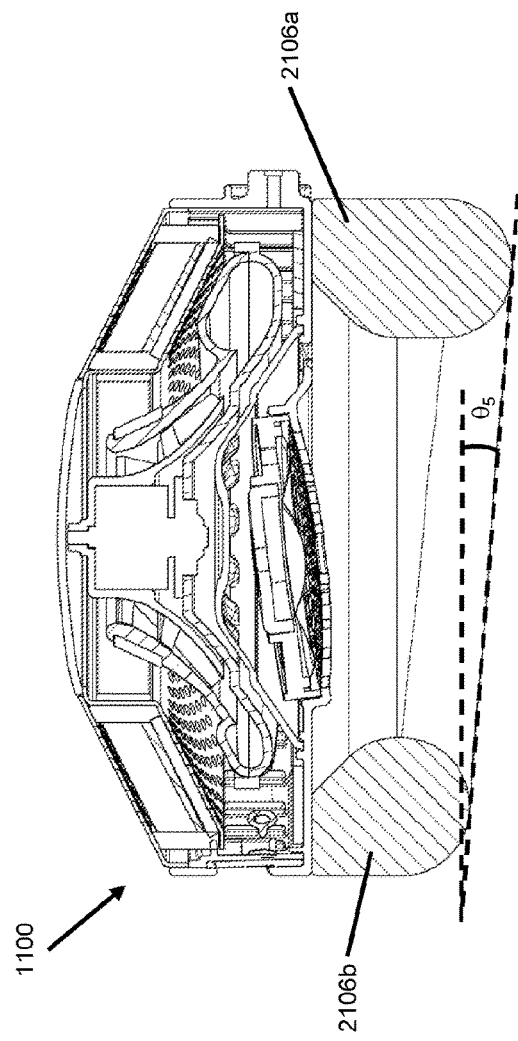
FIG. 13 is a cross-sectional view of the alternative speaker assembly of FIG. 12.

In this regard, in order to effectively deliver purified air to the user, it has been found that the flow rate of the air flow generated by the air purifier should be at least 2.4 litres per second such that each of the speaker assemblies 1100a, 1100b are required to deliver at least 1.2 litres per second. Furthermore, in order for each of the speaker assemblies 1100a, 1100b to deliver an air flow of at least 1.2 litres per second when their impeller speeds are limited to the above ranges, it has been found that the impeller 1109 of each of the speaker assemblies 1100a, 1100b preferably has a tip diameter WO (i.e. a distance between the mid-point of the trailing edges of opposing impeller blades) of no less than 20 mm. However, when the speaker assemblies 1100*a*, 1100*b* make use of highly efficient particulate filters (e.g. 90% and above) and are sealed so as to prevent any significant amount of air from bypassing the filter assembly 1107, then it has been found that the impeller 1109 of each of the speaker assemblies 1100*a*, 1100*b* should preferably have a tip diameter WO of no less than 35 mm, and preferably no less than 40 mm, In another preferred embodiment, each of the speaker assemblies 1100*a*, 1100*b* comprises an earpad 2106 that has an asymmetric cross-section. In this regard, circumaural and supra-aural headphones have earpads whose shape is that of a closed loop so that they encompass the entire ear or just the opening to the ear canal, and a conventional earpad has a symmetric cross-section wherein the depth of the earpad is continuous around its circumference, as illustrated in the above described embodiment. In this alternative embodiment, the earpad 2106 is arranged such that the depth/thickness (D) of the earpad 2106 varies gradually around the circumference of the earpad 2106, with a deepest/thickest portion 2106*a* of the earpad 2106 being diametrically opposed to a thinnest/shallowest portion 2106*b* of the earpad 2106, as illustrated in FIGS. 12 and 13. In the embodiment illustrated in FIGS. 12 and 13, the outer surface of the earpad 2106 therefore defines an angle ($\theta_5$) relative to the inner surface of the earpad 2106 that is attached to the speaker housing 1102 (and therefore relative to the base of the speaker housing 1102) of approximately 5 degrees; however, this angle ($\theta_5$) could be anything from 5 to 15 degrees. This has several advantages.

Firstly, it is preferable that the speaker/drive unit 1105 is parallel with the user's ear, which typically requires that the speaker/driver unit 1105 is mounted at an angle of 10 to 15 degrees relative to the base of the speaker housing 1102 to which it is attached, as illustrated in the above described embodiment. This angle provides that when the speaker assembly 1100 rotates due to the tapered shape of the user's head the speaker/driver unit 1105 will then be generally parallel with the user's ear. The use of an earpad 2106 that has an asymmetric cross-section provides that the angle of the speaker/driver unit 1105 relative to the base of the speaker housing 1102 can be reduced to less than 10 degrees and, depending on the angle of the outer surface of the earpad 2106 relative to the base of the speaker housing 1102, can even eliminate the need to angle the speaker/driver unit 1105 relative to the speaker housing 1102. This is particular advantageous in the head wearable air purifier 1000 described herein, as a reduction in the angle of the speaker/driver unit 1105 relative to the speaker housing 1102 reduces the space required behind the speaker/driver unit 1105 and thereby reduces the overall volume required to house the internal components of the speaker assembly 1100.

Secondly, circumaural and supra-aural headphones require that the headband is configured to apply pressure to against the sides of the user's head in order to seal the earpads around or onto the user's ear. This pressure can reduce the comfort of the headphones for the user. The use of an earpad 2106 that has an asymmetric cross-section also provides that the pressure applied by the headband that is required in order to seal the earpads 2106 around or onto the user's ear can be reduced, thereby improving the comfort for the user.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. For example, in the above described embodiment the head wearable air purifier comprises a headphone system in which two ear cups are provided on opposite ends of a headband. However, the head wearable air purifier could equally comprise any head wearable article that could be used to support an air flow generator and a filter assembly on the head of a user. For example, the head wearable air purifier could comprise any type of headgear, such as a hat or a helmet, including safety hats and helmets, bicycle helmets, motorcycle helmets etc. In particular, the head wearable air purifier could comprise a headgear, such as a bicycle helmet or motorcycle helmet, which supports an air purifier assembly such as that described herein.

In addition, whilst in the above described embodiments both speaker assemblies include motor-driven impellers and filter assemblies, with both speaker assemblies then providing filtered/purified air to the nozzle, it is also possible that only one of the two speaker assemblies include a motor-driven impeller and a filter assembly, such that only a single speaker assembly then provides filtered/purified air to the nozzle. However, such an arrangement would not be as effective as those of the above described embodiments.

Furthermore, in the above described embodiments the impeller housing and the volute are integrally formed with one another; however, it is also possible that the impeller housing and the volute could be separate components that are connected together. Similarly, whilst in the above described embodiment the speaker housing comprises a speaker chassis and a top cover, the speaker housing equally be comprised of more than two separate parts. By way of further example, whilst in the above described embodiments the filter assembly, including the filter seat and the one or more filter assemblies, are generally frusto-conical in shape, the filter assembly could equally be annular in shape. However, an annular filter assembly would have a smaller area available for filtration, which would reduce the effectiveness of the purifier.

The invention claimed is:

1. A head wearable air purifier comprising:
   a first speaker assembly arranged to be worn over a first ear of a user and a second speaker assembly arranged to be worn over a second ear of the user, wherein the first speaker assembly comprises a speaker housing, the speaker housing encompassing a speaker, a filter assembly, a motor-driven impeller for creating an airflow through the filter assembly, and an air outlet downstream from the filter assembly for emitting a filtered airflow from the first speaker assembly, wherein the motor-driven impeller has a tip diameter of no less than 20 mm;
   a nozzle arranged to receive the filtered airflow from the first speaker assembly, the nozzle comprising an air outlet arranged to emit the received filtered airflow from the head wearable air purifier;

an outlet duct configured to connect the nozzle to the air outlet of the first speaker assembly, wherein the outlet duct is configured to revolve relative to the speaker housing of the first speaker assembly between a first position and a second position, wherein the outlet duct is aligned with and connected to the air outlet of the first speaker assembly when in the first position, and wherein the outlet duct is connected to the first speaker assembly and is offset and disconnected from the air outlet of the first speaker assembly when in the second position; and a control circuit arranged to control a rotational speed of the motor-driven impeller of the first speaker assembly such that a maximum rotational speed of the motor-driven impeller is from 9,000 to 18,000 RPM.

2. The head wearable air purifier of claim 1, wherein the control circuit is arranged to control a rotational speed of the motor-driven impeller of the first speaker assembly such that the maximum rotational speed of the motor-driven impeller is from 10,000 to 14,000 RPM.

3. The head wearable air purifier of claim 1, wherein the first speaker assembly is configured to provide a filtered airflow having a maximum flow rate of at least 1.2 litres per second.

4. The head wearable air purifier of claim 1, wherein the tip diameter of the motor-driven impeller of the first speaker assembly is no less than 25 mm.

5. The head wearable air purifier of claim 1, wherein the motor-driven impeller of the first speaker assembly is a mixed flow impeller that has a conical shape.

6. The head wearable air purifier of claim 1, wherein the second speaker assembly comprises a speaker housing, the speaker housing encompassing a speaker, a filter assembly, a motor-driven impeller for creating an airflow through the filter assembly, and an air outlet downstream from the filter assembly for emitting a filtered airflow from the second speaker assembly, and wherein the nozzle is further arranged to receive the filtered airflow from the second speaker assembly and to emit both of the received filtered airflows from the head wearable air purifier.

7. The head wearable air purifier of claim 6, wherein the control circuit is further arranged to control a rotational speed of the motor-driven impeller of the second speaker assembly such that the maximum rotational speed of the motor-driven impeller is from 10,000 to 14,000 RPM.

8. The head wearable air purifier of claim 6, wherein the second speaker assembly is configured to provide a filtered airflow having a maximum flow rate of at least 1.2 litres per second.

9. The head wearable air purifier of claim 6, wherein the motor-driven impeller of the second speaker assembly has a tip diameter of no less than 25 mm.

10. The head wearable air purifier of claim 6, wherein the motor-driven impeller of the second speaker assembly is a mixed flow impeller that has a generally conical shape.

11. The head wearable air purifier of claim 1, wherein the control circuit is arranged to implement active noise cancellation for both the first speaker assembly and the second speaker assembly.

12. The head wearable air purifier of claim 11, wherein the first speaker assembly and the second speaker assembly each comprise at least one of a feedback microphone and a feedforward microphone that are arranged to provide active noise cancellation inputs to the control circuit.

13. The head wearable air purifier of claim 1, wherein the control circuit comprises one or more circuit boards disposed within at least one of the first speaker assembly and the second speaker assembly.

14. The head wearable air purifier of claim 1, wherein the first speaker assembly is mounted on a first end of a headband and the second speaker assembly mounted on an opposite, second end of the headband, the headband being arranged to be worn on the head of a user.

15. The head wearable air purifier of claim 1, wherein the motor-driven impeller is a mixed flow impeller.

16. A head wearable air purifier comprising:
a first speaker assembly arranged to be worn over a first ear of a user and a second speaker assembly arranged to be worn over a second ear of the user, wherein the first speaker assembly comprises a speaker housing, the speaker housing encompassing a speaker, a filter assembly, a motor-driven impeller for creating an airflow through the filter assembly, and an air outlet downstream from the filter assembly for emitting a filtered airflow from the first speaker assembly;

a nozzle arranged to receive the filtered airflow from the first speaker assembly, the nozzle comprising an air outlet arranged to emit the received filtered airflow from the head wearable air purifier;

an outlet duct configured to connect the nozzle to the air outlet of the first speaker assembly, wherein the outlet duct is configured to revolve relative to the speaker housing of the first speaker assembly between a first position and a second position, wherein the outlet duct is aligned with and connected to the air outlet of the first speaker assembly when in the first position, and wherein the outlet duct is connected to the first speaker assembly and is offset and disconnected from the air outlet of the first speaker assembly when in the second position; and a control circuit arranged to control a rotational speed of the motor-driven impeller of the first speaker assembly such that a maximum rotational speed of the motor-driven impeller is from 9,000 to 18,000 RPM.

17. The head wearable air purifier of claim 16, wherein an open end of the outlet duct configured to connect to the air outlet has an angular extension that is greater than an angular extension of the air outlet.

18. A head wearable air purifier comprising:
a first speaker assembly arranged to be worn over a first ear of a user and comprising a first speaker housing, the first speaker housing encompassing a first speaker, a first filter assembly, a first motor-driven impeller for creating an airflow through the first filter assembly, and a first air outlet downstream from the first filter assembly for emitting a first filtered airflow from the first speaker assembly;

a second speaker assembly arranged to be worn over a second ear of the user and comprising a second speaker housing, the second speaker housing encompassing a second speaker, a second filter assembly, a second motor-driven impeller for creating an airflow through the second filter assembly, and a second air outlet downstream from the second filter assembly for emitting a second filtered airflow from the second speaker assembly;

a nozzle extending between the first speaker assembly and the second speaker assembly, the nozzle arranged to receive the first filtered airflow and the second filtered airflow, wherein the nozzle comprises an air outlet arranged to emit both of the received filtered airflows towards a face of the user; and an outlet duct configured to connect the nozzle to the air outlet of the first speaker assembly, wherein the outlet duct is configured to revolve relative to the first speaker housing of the first speaker assembly between a first position and a second position, wherein the outlet duct is aligned with and connected to the air outlet of the first speaker assembly when in the first position, and wherein the outlet duct is connected to the first speaker assembly and is offset and disconnected from the air outlet of the first speaker assembly when in the second position, and wherein the first speaker assembly and the second speaker assembly are symmetrical with respect to an axis that bisects the nozzle into two symmetrical portions.

19. The head wearable air purifier of claim 18, wherein the first motor-driven impeller of the first speaker assembly has a tip diameter of no less than 20 mm.

* * * * *